US012602572B2

(12) United States Patent
Crabtree et al.

(10) Patent No.: US 12,602,572 B2
(45) Date of Patent: Apr. 14, 2026

(54) COLLABORATIVE GENERATIVE ARTIFICIAL INTELLIGENCE CONTENT IDENTIFICATION AND VERIFICATION

(71) Applicant: QOMPLX LLC, Reston, VA (US)

(72) Inventors: Jason Crabtree, Vienna, VA (US); Richard Kelley, Woodbridge, VA (US); Jason Hopper, Halifax (CA); David Park, Fairfax, VA (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/669,534

(22) Filed: May 21, 2024

(65) Prior Publication Data

US 2025/0209312 A1 Jun. 26, 2025

Related U.S. Application Data

(63) Continuation-in-part of application No. 18/395,482, filed on Dec. 23, 2023.

(51) Int. Cl.
*G06N 3/0475* (2023.01)

(52) U.S. Cl.
CPC .................................. *G06N 3/0475* (2023.01)

(58) Field of Classification Search
CPC ...................................................... G06N 3/0475
See application file for complete search history.

(56) References Cited

U.S. PATENT DOCUMENTS

| | | | | |
|---|---|---|---|---|
| 5,655,031 | A | * | 8/1997 | Yukawa ............... G06V 10/751 |
| | | | | 382/156 |
| 6,285,999 | B1 | | 9/2001 | Page |
| 2007/0014435 | A1 | | 1/2007 | Mirowski et al. |
| 2008/0133252 | A1 | | 6/2008 | Chu et al. |
| 2012/0004958 | A1 | | 1/2012 | Bloom et al. |
| 2014/0007152 | A1 | * | 1/2014 | Pora ................... H04N 21/4394 |
| | | | | 725/18 |
| 2014/0373036 | A1 | | 12/2014 | Phillips et al. |
| 2017/0017407 | A1 | | 1/2017 | Wei et al. |
| 2019/0026299 | A1 | * | 1/2019 | Liang .................... G06F 3/0641 |
| 2019/0236371 | A1 | | 8/2019 | Boonmee et al. |
| 2021/0390447 | A1 | | 12/2021 | Cheruvu et al. |

(Continued)

FOREIGN PATENT DOCUMENTS

CN 117892270 A * 4/2024

*Primary Examiner* — Khanh B Pham
*Assistant Examiner* — Kweku William Halm
(74) *Attorney, Agent, or Firm* — NK Patent Law

(57) ABSTRACT

The Generative AI Content Verification Exchange systematically registers and stores content generated by AI and real people alike. Upon submission, the system categorizes content into distinct groups, then deconstructs it into multiple segments using various methods. Each segment is assigned a unique hash value, termed a "part identifier," ensuring individualized identification. This registration process, combining grouping, segmentation, and hashing, enhances content traceability and retrieval. The resulting database not only organizes generated content by groups but also allows for efficient and secure referencing of specific content segments. A content similarity score may be generated by comparing hash values against a large corpus of registered content. The similarity score is indicative of the likelihood, or not, of an input content being in part registered content.

20 Claims, 14 Drawing Sheets

(56) References Cited

U.S. PATENT DOCUMENTS

| | | | |
|---|---|---|---|
| 2022/0377107 A1* | 11/2022 | Lee | H04L 63/1483 |
| 2023/0111337 A1 | 4/2023 | Maltz | |
| 2023/0222762 A1* | 7/2023 | Andriushchenko | G06V 10/774 |
| | | | 382/209 |
| 2023/0232052 A1 | 7/2023 | Khavronin et al. | |
| 2023/0252224 A1 | 8/2023 | Tran | |
| 2023/0274094 A1 | 8/2023 | Tunstall-Pedoe et al. | |
| 2023/0276109 A1 | 8/2023 | Sanborn et al. | |
| 2023/0326211 A1 | 10/2023 | Jaiswal et al. | |
| 2023/0386475 A1* | 11/2023 | Frenzel | G10L 17/04 |

* cited by examiner

| Part | Content Group | Generating Service |
|------|---------------|--------------------|
| $P_1'$ | $C_1$ | Service 1 |
| $P_2'$ | $C_1$ | Service 1 |
| ■<br>■<br>■ | ■<br>■<br>■ | ■<br>■<br>■ |
| $P_n'$ | $C_2$ | Service 3 |
| $P_{n+1}'$ | $C_2$ | Service 3 |

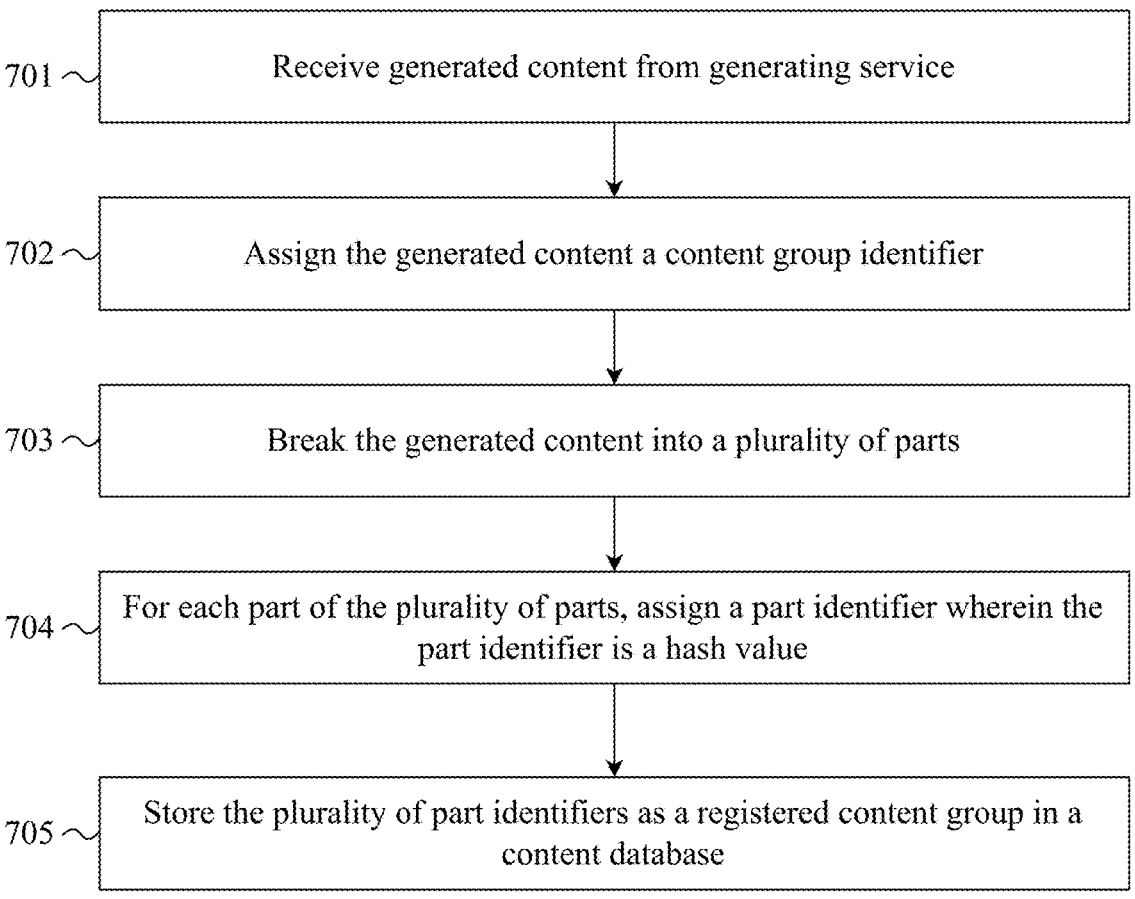

701 ~| Receive generated content from generating service

702 ~| Assign the generated content a content group identifier

703 ~| Break the generated content into a plurality of parts

704 ~| For each part of the plurality of parts, assign a part identifier wherein the part identifier is a hash value 705 ~| Store the plurality of part identifiers as a registered content group in a content database

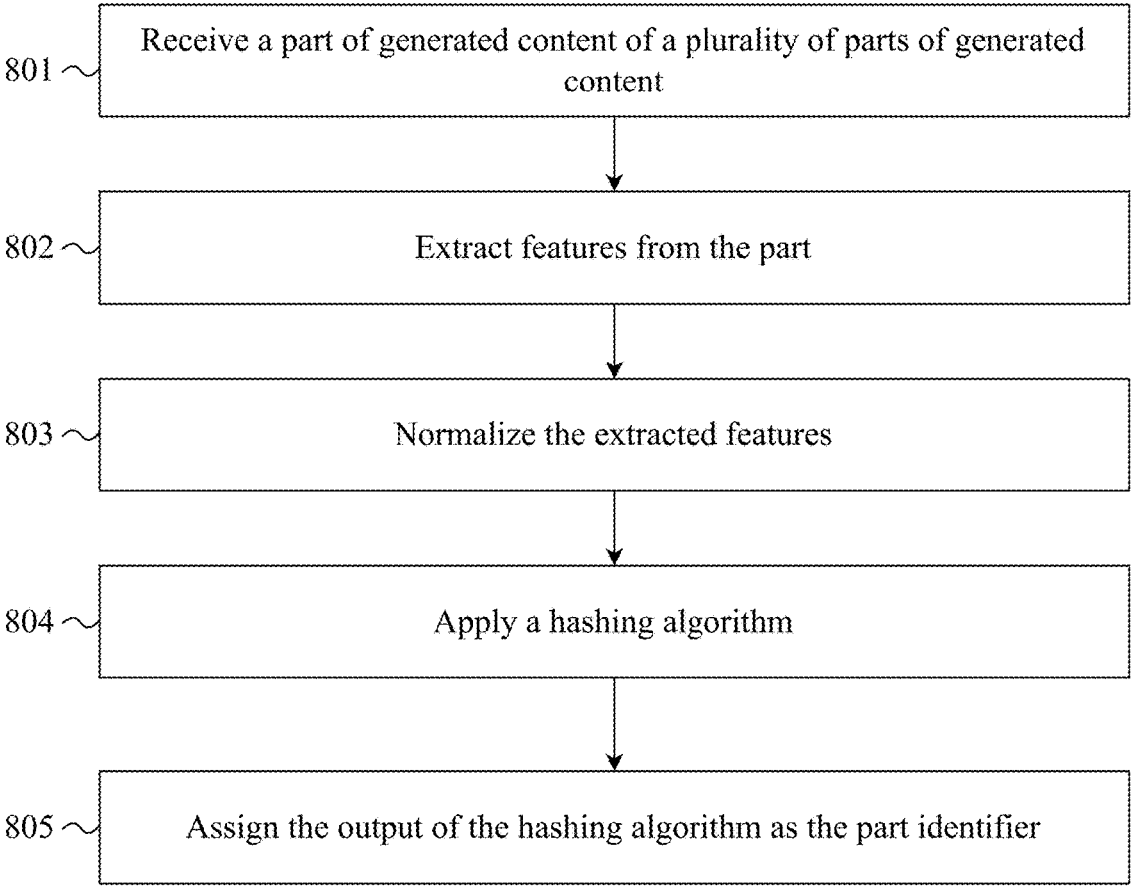
801 ~ Receive a part of generated content of a plurality of parts of generated content
802 ~ Extract features from the part
803 ~ Normalize the extracted features
804 ~ Apply a hashing algorithm
805 ~ Assign the output of the hashing algorithm as the part identifier
800
FIG. 8

1100 ~

1100 ~

1100 ~

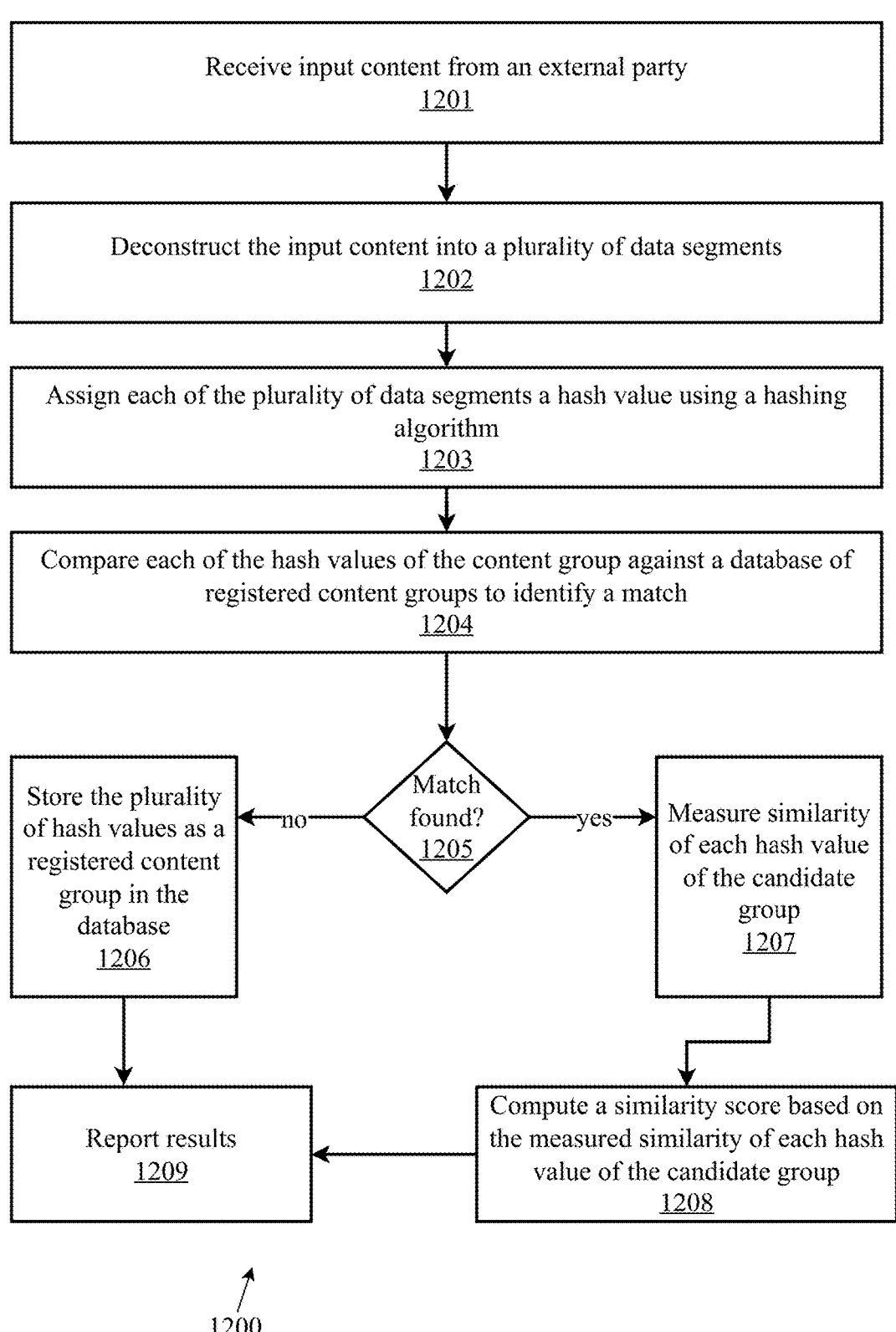

Receive input content from an external party
1201

Deconstruct the input content into a plurality of data segments
1202

Assign each of the plurality of data segments a hash value using a hashing algorithm
1203

Compare each of the hash values of the content group against a database of registered content groups to identify a match
1204

Match found?
1205 no

Store the plurality of hash values as a registered content group in the database
1206 yes

Measure similarity of each hash value of the candidate group
1207

Compute a similarity score based on the measured similarity of each hash value of the candidate group
1208

Report results
1209

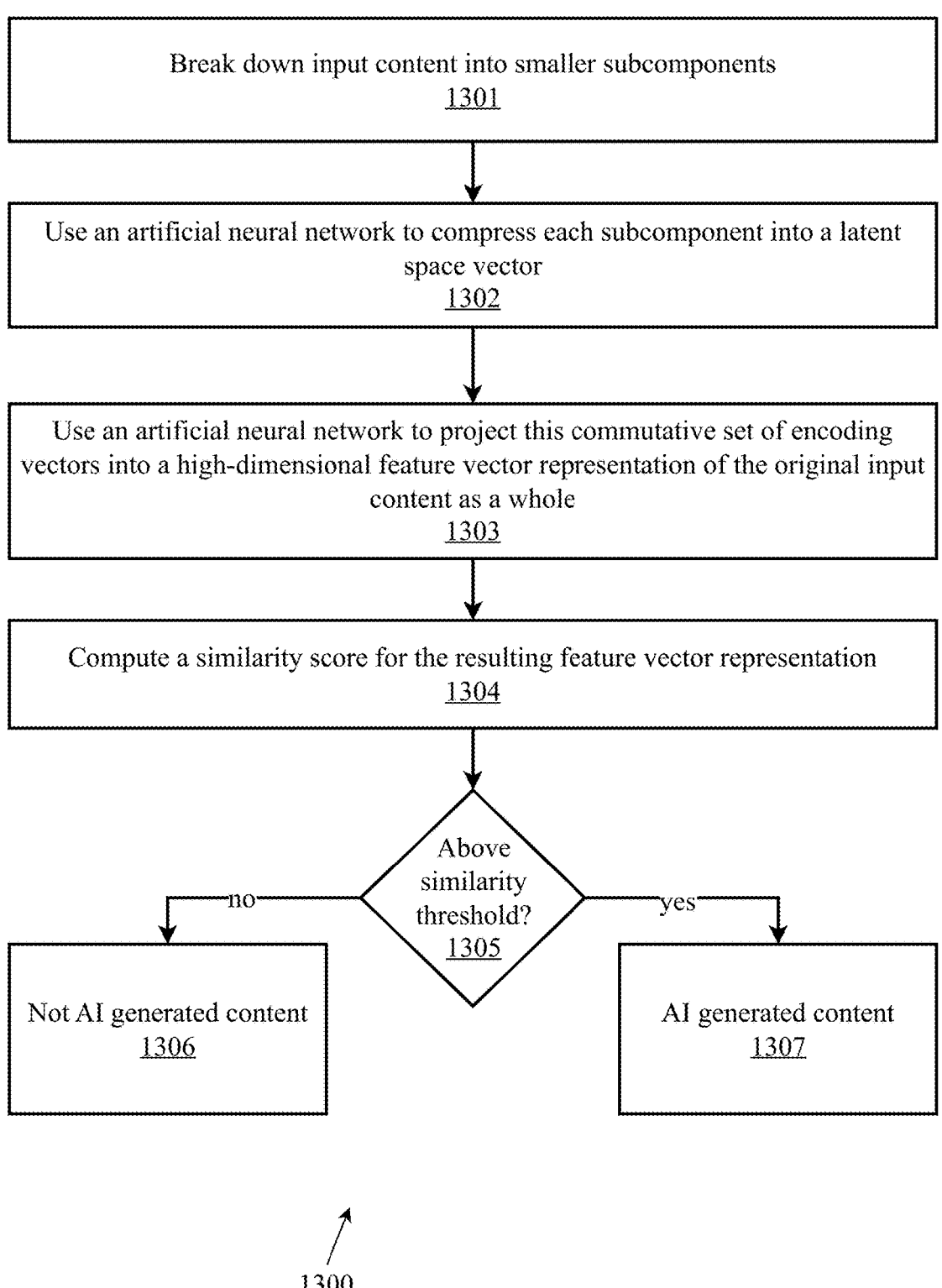

Break down input content into smaller subcomponents
1301

Use an artificial neural network to compress each subcomponent into a latent space vector
1302

Use an artificial neural network to project this commutative set of encoding vectors into a high-dimensional feature vector representation of the original input content as a whole
1303

Compute a similarity score for the resulting feature vector representation
1304

Above similarity threshold?
1305 no yes

Not AI generated content
1306

AI generated content
1307

COLLABORATIVE GENERATIVE ARTIFICIAL INTELLIGENCE CONTENT IDENTIFICATION AND VERIFICATION

CROSS-REFERENCE TO RELATED APPLICATIONS

Priority is claimed in the application data sheet to the following patents or patent applications, each of which is expressly incorporated herein by reference in its entirety:
Ser. No. 18/395,482

BACKGROUND OF THE INVENTION

Field of the Art

The present invention is in the field of content identification, and more particularly to identification and verification of generative artificial intelligence derived content.

Discussion of the State of the Art

With the rise of Generative Artificial Intelligence (GenAI) there has been an explosion in generated digital content that is often nearly impossible with a human eye or traditional analysis techniques to distinguish from human generated content, especially when embedded in applications, media, news, or other experiences. This is especially problematic when the volume of generated images, video, sounds and text that is flooding the internet is considered. So-called "deep fakes", where people in an existing image, sound or video are replaced with someone else's likeness using artificial neural networks and other techniques have raised concerns across industry and governments. Newer techniques like generative adversarial networks (GANs) and large language models (LLMs) can even support generation of images, video, or sound where no initial likeness is replaced. Generated media has proliferated on the Internet and in private datasets at record speed where bots are creating realistic sounding journal and news articles, students are generating term and research papers, and lawyers are using GenAI to automatically generate important legal documents, albeit with mixed results. The advent of AI "agents" acting as digital doppelgangers will further accelerate the trend by amplifying human-directed content generation and distribution and unsupervised creation.

Historically, content registries have been focused on tracking the delivery of media to multiple devices (e.g., television, mobile, virtual reality/augmented reality, radio) and the motivation for such tracking was principally for the purpose of quality assurance of delivered media determination, ratings determinations, or advertising purposes relating to combinations metrics such as of quality, distribution, engagement, and demographics. Common approaches to content categorization and labeling rely on viewer metadata, quality metrics, content chunk fingerprints, and labels. These approaches largely depend on content distributors and aggregators to appropriately categorize and label material. However, end-user interaction with the actual content registries is not intended or supported in these systems. Similarly, recently proposed content registries like the Content Authenticity Initiative (CAI) rely on the following process: cryptographic asset hashing of the image and metadata; at creation user selected information attachments to the content; user selectable attribution or anonymity; tools like Photoshop for images or equivalent tools for sound or video then embed additional secure capture metadata that is preserved and amended with history data of alterations; open standards to enable partnerships with news organizations to see and comment on secure capture information and any embedded content edits preserved through the publishing process natively in their content management systems; social media product flow is being amended to preserve CAI metadata by default; and a verification site is being made available for content lookup based on CAI metadata. Unfortunately, these approaches fail to adequately address the adversarial nature of significant portions of generated content. Human and AI agents which are being used for content generation are becoming as diverse as fake works of art, disinformation/misinformation, scams, pornography et cetera, and are intentionally trying to misrepresent their content and provenance in order to pass muster by evaluators and these registries. In other words, they will not and do not dutifully create and maintain accurate CAI data or avoid selective resampling or reencoding of their work to preserve hash validity in adversarial environments. Accordingly, a more robust solution is demanded to meet the practical declared and implied policy goals and emerging legal requirements for provenance, especially when focused on bad actors and not just dutiful citizens and corporations. Additionally, prior systems in the art were typically focused on relatively small segments of content (e.g., TV shows on linear television networks) which have a defined and quite contained content library that not only aids in reconciliation of viewership with existing or prospective advertising spend, brand engagement, content desirability, etc. The vast range of content which must be cataloged for the purpose of answering the "AI or not" question, or more expansive provenance question across all global media, necessitates a massively scalable analytics and database infrastructure with the ability to efficiently support and coordinate diverse classification and analysis routines across a broad range of cloud, self-hosted, CDN, edge, and personal/wearable/mobile devices.

Recent public calls to regulate GenAI have reached the White House, prompting an executive order from the current administration that "establishes new standards for AI safety and security, protects Americans' privacy, advances equity and civil rights, stands up for consumers and workers, promotes innovation and competition, advances American leadership around the world, and more." Among the requirements is to: "Protect Americans from AI-enabled fraud and deception by establishing standards and best practices for detecting AI-generated content and authenticating official content" and "The Department of Commerce will develop guidance for content authentication and watermarking to clearly label AI-generated content. Federal agencies will use these tools to make it easy for Americans to know that the communications they receive from their government are authentic and set an example for the private sector and governments around the world." Similarly, the European Parliament passed the 2024 AI Act which provides additional guidelines for AI service providers operating in European markets with up to 7% of annual prior year revenues as fines for violations of use restrictions, duty of care, or privacy elements resulting from prohibited implementations or insufficient risk management practices.

It is important to note that the mandates face several critical challenges; two of the most pressing relate to the verification of any proposed watermark or similar type of labeling and the separate challenge of addressing generative content where illicit actors (who are not likely to behave in accordance with government mandates) are the content generator or distributor. While watermarking goes a long way to help, there is still a matter of how does one verify a watermark or otherwise prove to some degree that content is indeed output from GenAI?

What is needed is a generative AI content verification exchange capability that enables diverse counterparties to engage in the "clearing" of content for identification, provenance, and commerce.

SUMMARY OF THE INVENTION

Accordingly, the inventor has conceived and reduced to practice, a system and method for providing Generative AI Content Verification Exchange that systematically registers and stores content generated by applications, AI agents or tools and real people alike. Upon submission and leveraging its own active scalable crawling infrastructure and dynamically configurable proxy network, the system categorizes found or submitted content into distinct groups, then deconstructs it into multiple segments using various methods. Depending on the nature of the content and the degree to which it is likely to be targeted for manipulation via a scoring process (e.g., politically charged content or content of immense monetary value), multiple different segmentation methods or verification techniques may be utilized. Each segment is stored and also assigned a unique hash value, termed a "part identifier," ensuring individualized identification of works, elements of works tied to a segment, or fingerprints (e.g., specific elements like color or pigment usage, brush strokes, angles of handwriting with different velocity or acceleration or pressure characteristics). This registration process, combining grouping, segmentation, and hashing, enhances content traceability and retrieval and does not require intentional registry action as any AI agent, 3rd party system, user, or crawler can submit content via application programming interfaces (APIs), with support for various potential APIs including RESTful as well as gRPC embodiments. The system checks for potentially relevant existing pieces of content and can optionally record potential linkages in either or both a graph and vector form. In one preferred embodiment, a combination of SQL, NoSQL, Graph, and Vector databases are used with a coordinating API layer providing universal access to multiple underlying data stores and routing queries to at least one of the specialized databases. The resulting databases acting as a group, not only organize generated content by groups but also allows for efficient and secure referencing of specific content segments, characteristics, and techniques through several types of indexing and query formalisms. The systematic registration and storage framework enable streamlined management of diverse AI-generated and human created content for various applications, such as analysis, search, and verification to include an understanding of how such content appeared on the web (e.g., was a piece of content presented differently when crawled from a residential IP address in Australia from a commercial IP address in New Jersey). The configurable proxy network and crawling framework can support verification or supplemental capture of web-accessible content to elucidate and capture content presentation differences such as this, to include content hosted in Onionspace (e.g., via TOR node access) or similar. The system may also optionally record privacy, terms of service, cookies, beacons or other artifacts of the sites or applications visited during this process. A content similarity score may be generated by comparing hash values, vectors, or graph relations against a large corpus of indexed content or within a given cluster or neighborhood where at least one content element, fingerprint, or technique is selected. The similarity score may be dependent on an input content being in part registered content for an exact match. The more individual segments that are highly similar or exact, the more likely that such content is strongly related. Since content segments as well as stylistic, medium, color, and technique elements may also be determined and stored, the system can still provide scores or relationships to similar elements e.g., a painting that is unregistered (or a digital rendering of one) might still be identified as similar to or potentially inspired by a known work or category. For example, an oil painting of dancers with bright colors might be strongly reminiscent of the brush work of Degas' 1879 work entitled "Entrance of the Masked Dancers" and an edge may be created to link the submitted piece to Impressionist art as a category. Additional parametric studies on content can also be conducted by the system, for example colorizing or making a black and white photograph from a colored piece to compare common transformations for a given media type against the registry. These may be defined by the user at submission or query time, suggested by the system based on the submission during its own classification stage, or part of ongoing indexing operations to improve system performance and accuracy on a periodic basis. Similarly, the system may perform checks looking for specific byte patterns common to particular stenographic tools which can be stored in its database of analytical routines and queries and templates.

According to a preferred embodiment, a system for collaborative generative artificial intelligence (GenAI) content identification and verification is disclosed, comprising: a computing device comprising at least a memory and a processor; a content verification subsystem comprising a first plurality of programming instructions that, when operating on the processor, cause the computing system to: receive input content from an external party; deconstruct the input content into a plurality of data segments; for each data segment: use a hashing algorithm to assign a hash value; add the hash value to a content group; compare each of the hash values of the content group against a database of registered content groups to identify a match, wherein the registered content groups comprise a plurality of hash values representing generated content and created content; and if a match is found, produce a similarity score based on the hashed data across the matched registered content group.

According to another preferred embodiment, a method for collaborative generative artificial intelligence (GenAI) content identification and verification is disclosed, comprising the steps of: receiving input content from an external party; deconstructing the input content into a plurality of data segments; for each data segment: using a hashing algorithm to assign a hash value; adding the hash value to a content group; comparing each of the hash values of the content group against a database of registered content groups to identify a match, wherein the registered content groups comprise a plurality of hash values representing generated content and created content; and if a match is found, producing a similarity score based on the hashed data across the matched registered content group.

According to an aspect of an embodiment, further comprising a content registration subsystem comprising a second plurality of programming instructions that, when operating on the processor, cause the computing system to: receive content from a generating service; assign a group identifier to the content, wherein the group identifier is associated with the generating service; deconstruct the content into a plurality of data segments; for each data segment: use the hashing algorithm to assign a segment identifier; link the segment identifier with the group identifier; add the segment identifier to a registered content group; store the registered content group in the database.

According to an aspect of an embodiment, the generating service uses a generative artificial intelligence system to create the generated content.

According to an aspect of an embodiment, the content is received from a content creator and the group identifier is associated with the content creator.

According to an aspect of an embodiment, the hashing algorithm is a perceptual hashing algorithm.

According to an aspect of an embodiment, the hashing algorithm is a locality-sensitive hashing algorithm.

According to an aspect of an embodiment, the input content is deconstructed based on fractal distributions, user-declared meshes, or system-declared mesh patterns.

According to an aspect of an embodiment, wherein if a match is not found, the content group is stored in the database as a registered content group.

According to an aspect of an embodiment, wherein the hashing algorithm is a neural network model.

According to an aspect of an embodiment, the content verification subsystem is further configured to: create vectorized representations of content relationship graphs or characteristic graphs from subgraphs relevant to each data segment or content piece; perform vector comparisons between the subgraphs for multiple pieces of content; use the vector comparisons to further corroborate or dispel content similarity by considering: the input content itself, a distribution of the input content; broader Internet or other references to the content pieces; and temporal dynamics of the content pieces' utilization post creation; and adjust the similarity score based on the vector comparisons and the considered factors.

BRIEF DESCRIPTION OF THE DRAWING FIGURES

FIG. 6 is a diagram illustrating an exemplary content registration library, according to an embodiment.

FIG. 7 is a flow diagram illustrating an exemplary method for registering received content using a GenAI CVX, according to an embodiment.

FIG. 8 is a method diagram illustrating an exemplary method for assigning a part identifier using a perceptual hashing function, according to an embodiment.

Figure 11A:
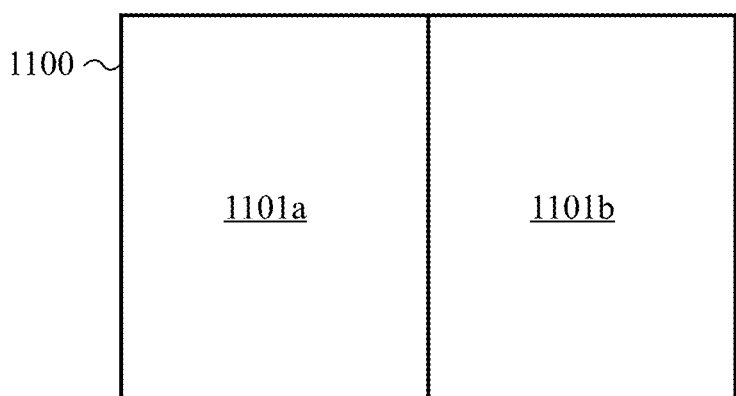
Figure 11B:
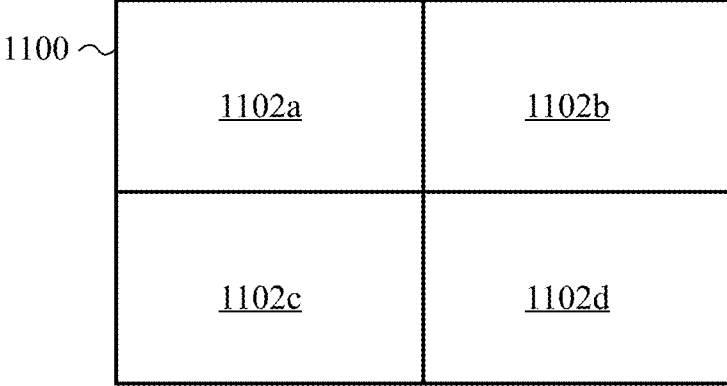
Figure 11C:
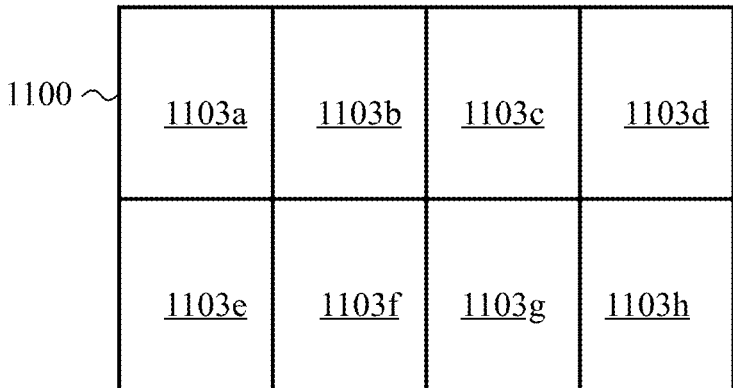

FIGS. 11A, 11B, and 11C illustrate an exemplary progression of deconstructing input image content, according to an embodiment.

FIG. 12 is a flow diagram illustrating an exemplary method for performing content similarity and verification using a GenAI CVX, according to an embodiment.

FIG. 13 is a flow diagram illustrating an exemplary method for creating a unique measure of generated content that is robust, tolerant of transformation, computationally reasonable, and platform agnostic, according to an embodiment.

Figure 14:
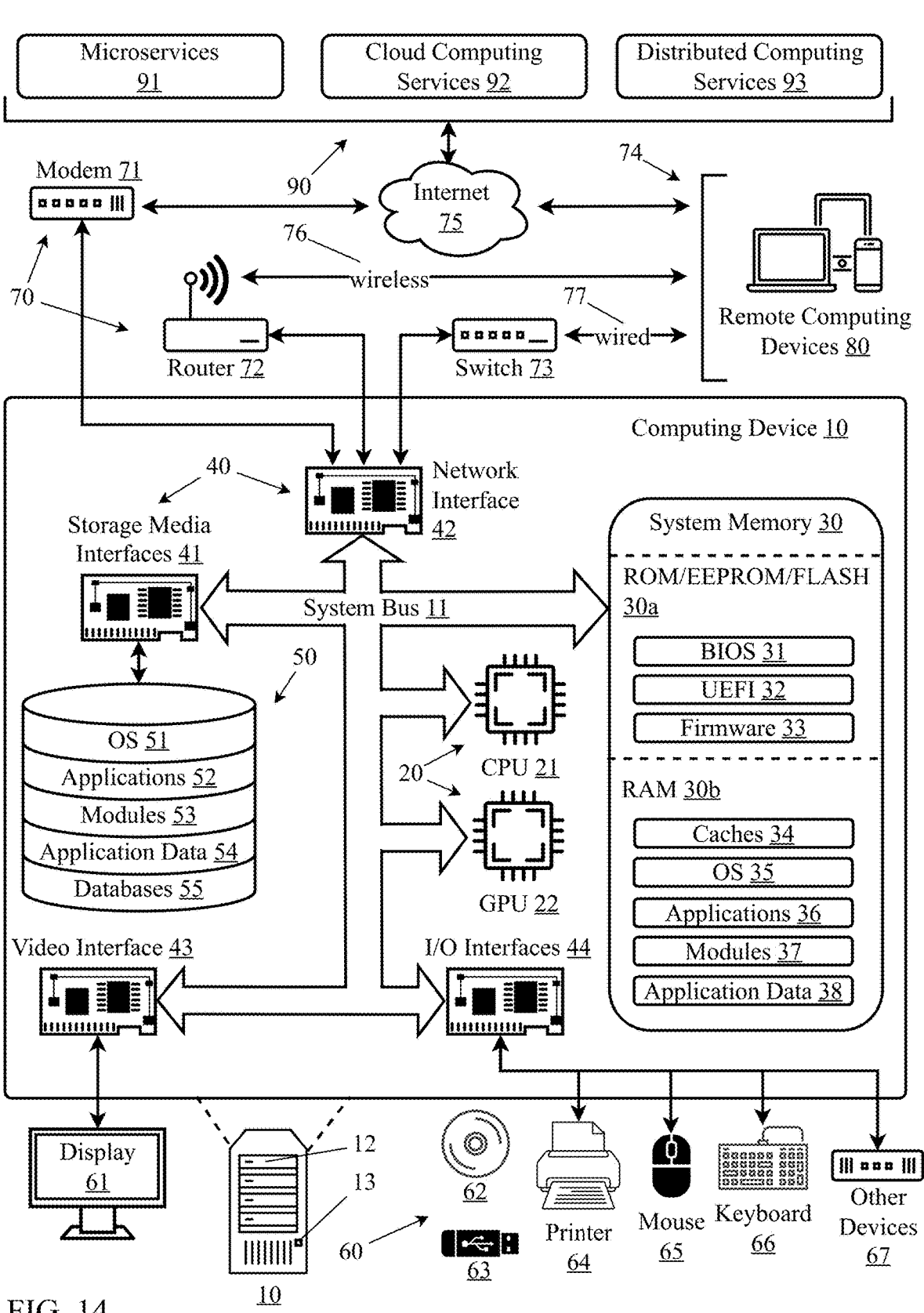

FIG. 14 illustrates an exemplary computing environment on which an embodiment described herein may be implemented.

DETAILED DESCRIPTION OF THE INVENTION

The inventor has conceived, and reduced to practice, a system and method for providing Generative AI Content Verification Exchange systematically registers and stores content generated by AI. Upon submission, the system categorizes content and content characteristics or artifacts into distinct groups, then deconstructs content into multiple segments using various methods. Segmentation methods may be predefined, based on templates associated with the classification or characterization routines, or dynamically constructed by the system (e.g., meshed to maximize information density). Each segment is assigned a unique hash value, termed a "part identifier," ensuring individualized identification. This registration process, combining grouping, segmentation, and hashing, enhances content traceability and retrieval. The resulting database not only organizes generated content by groups but also allows for efficient and secure referencing of specific content segments, characteristics, or fingerprints. The systematic registration and storage framework enable streamlined management of diverse content with adequate support for both traditional and generative AI-generated content for various applications, such as analysis, search, verification, and at least some elements of provenance. The framework may also persist relationships between publications (e.g., books, magazines, websites, videos, songs) and specific pieces of content or other publications. Since the platform can make both event or periodic (i.e., temporally based) classifications of content when it is submitted to, or checked against, the registry this enables the system to capture properties or scores associated with content quality, provenance, creator (e.g., human or supervised AI process or semi-supervised AI process or AI agent generated), first known appearance, appearance timestamps and locations (either or both web or physical) that can aid in superior content quality classifications. For example, the pervasive junk search engine optimization techniques like metadata loading, junk site creation and link banks, low quality machine generated content, content sampling/reposting are being massively amplified by the use of AI generated content. This is important since PageRank and similar kinds of reference-based URL scoring and quality or relevance ranking schemes are heavily reliant on such information, now widely abused, and are easily gamed.

When combined with user or application selection data, including from AI agents, the score or rank of content in the database may also include a probability that a given piece of content will be selected for user (e.g., downstream inclusion in a dataset, direct presentation to a user, for playback or engagement, or for use in augmenting or inspiring AI engine prompts like in an LLM or a adjustments in weightings either directly or through fine-tuning or adjustments/influence via a RAG). The system may also separately categorize paid or sponsored content references from organic, non-sponsored, links. The system may also capture crawling or user reported data, e.g., ads displayed to multiple users of a single site, to capture more details as to the paid content that is typically interacting with different primary content elements. This is central to addressing shortcomings in PageRank and current Internet search capabilities in Google Search, Microsoft Bing, DuckDuckGo and others where advertisements, paid content, and generated content obscure and reduce usability of the web and other e-accessible content.

According to an embodiment of the invention, user queries or system queries (e.g., from applications or the system itself, may support the desire to search for content of interest around a topic in addition to, or instead of, checking a single content piece against other known content. When done iteratively, either expressly by a user or via an AI-agent enhanced search process (which may optionally include ongoing user feedback or supervision), this can further support workspace or portfolio-based research and exploration of the web. This is central to iterative refinement of content, especially when considering the multitude of different devices commonly leveraged by users (e.g., watch, iPhone, VisionPro, laptop, desktop) across researching practical topics of interest (e.g., buying a home, planning a vacation, finding a car).

According to an embodiment, additional vector and search database indexes may be generated from the system based on the aggregated data across all user, AI agent, application submissions, and crawled inputs. The system may also provide content search capabilities based on topics via vectorized representations of semantic similarity metrics, keyword (direct in content or in the classification labels or relationships in the graph applied to content), or via prioritization of content or content labels/characteristics with high degrees of centrality. Since misinformation and disinformation and current events are commonly targeted by generative AI content manipulation, the system can leverage centrality measures for ranking the content nodes and time layers of the temporally enhanced content network simultaneously. One such exemplary approach is to compute the f-PageRank values of nodes and time layers in temporal networks obtained by solving the eigenvector of a multi-homogeneous map. This may again leverage link/reference quality metrics associated with various quality metrics of the content, distribution means and sites, etc. This differs from current state of the art in search technologies by enhancing the temporally enhanced ranking of content references with additional information, both from the classification, metadata, adversarially prepared chunking and hashing, and vector and graph representations of content for determining content communities that can adjust weights of content citations within the f-PageRank or other similar elements. This can substantially improve search relevance for users seeking to determine relevant content being generated via submitted weights to emphasize or de-emphasize the temporal elements (i.e., the current Zeitgeist) or emphasize or deemphasize generated content from unique concepts to change the resulting nature of the search results to bias towards more unique or more commonly engaged with content. Since users may also want to search through knowledge based on a time period of interest, the temporal attributes of content rankings may be expressly snapshotted over time. This can enable periodic framing of meaning or knowledge that may be useful to searchers, especially historians, lawyers and others who need to determine the meaning of various words, concepts, or media at time of publication and not as reinterpreted later with additional advancement, context, and hindsight. Similarly, blockbuster content events like the 19 Apr. 2024 release of Taylor Swift's The Tortured Poets Department underscore the importance of understanding the distribution sources of content and the timing and placement of responses to it. In this case, the vast number of sales, streams, articles, and responses across the Internet and the promotional approach (or lack thereof such as no pre-releasing of singles in advance of the album drop) all provide quantitative indicators of cultural significance in the moment.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 1:
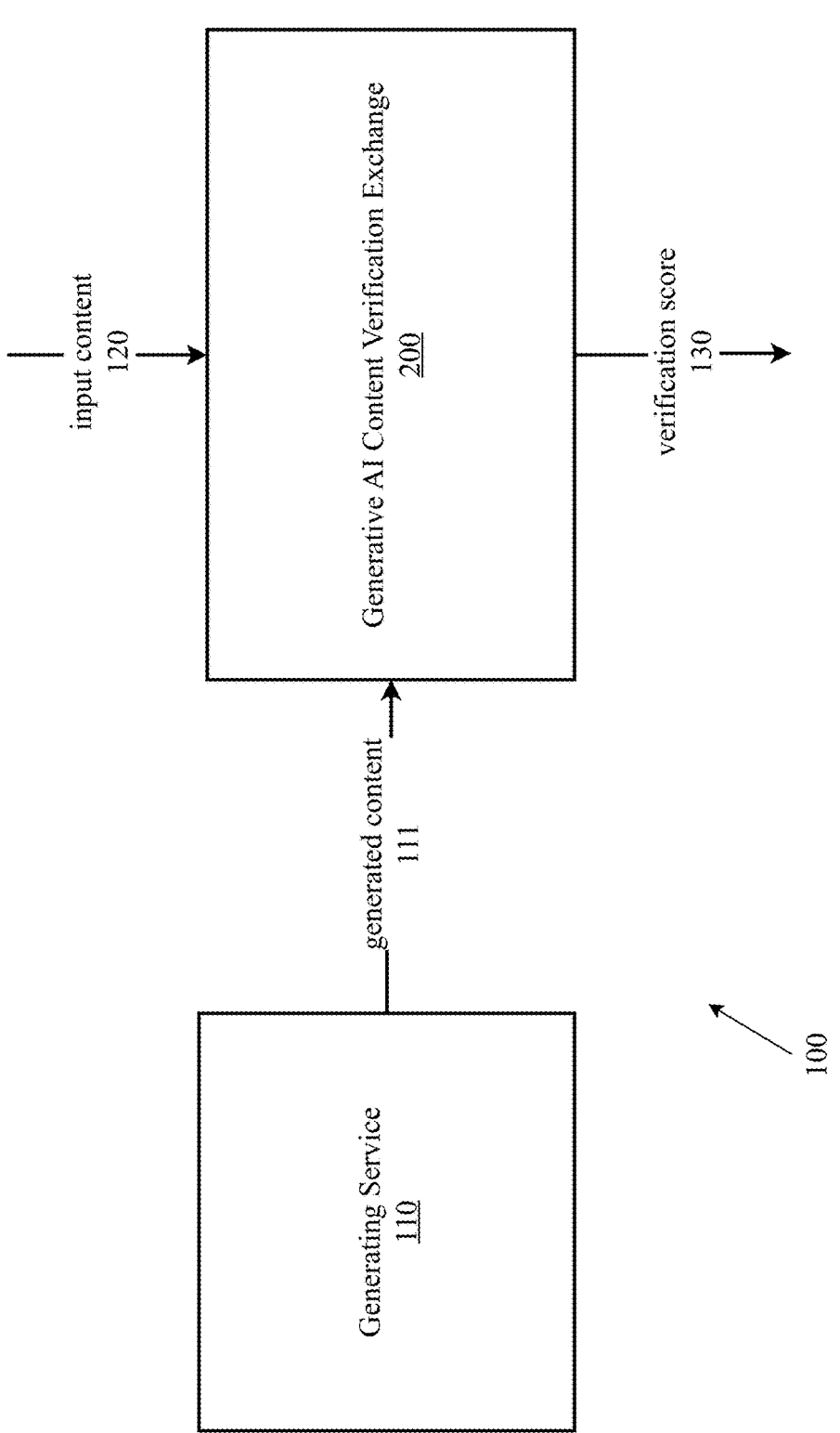
FIG. 1 is a block diagram illustrating an exemplary system architecture for collaborative generative artificial intelligence content identification and verification, according to an embodiment.

FIG. 1 is a block diagram illustrating an exemplary system architecture 100 for collaborative generative artificial intelligence (AI) content identification and verification, according to an embodiment. According to the embodiment, the system comprises one or more generating services 110 which can employ various generative artificial intelligence systems and/or models to generate a plurality of content in whole or in part including, but not limited to, images, illustration, photo, multimedia, podcast, music, endorsement, artwork, video, audio, text, and computer programming instructions (i.e., software code). A generating service 110 may receive a prompt to generate content from a user and present the generated content 111 to the user or to a downstream application or process. Examples of generation services which may be integrated with the generative AI content verification exchange 200 include OpenAI's GPT, Midjourney, Llama, Grok, BERT, StyleGAN, DALL-E, WaveGAN, Deepfake, and/or the like.

Each generating service 110 is configured to send generated content 111 to a generative AI content verification exchange (GenAI CVX). GenAI CVX 200 may create a collection of hashes to represent at least a portion of the generated content. In an embodiment, the collection of hashes may additionally represent select metadata associated with the generated content or the viewing or utilization of a piece of content being submitted for checks or verification or in searching through content. For example, metadata can include device type, device identifiers, IP address, geographic location, MAC address, IEINs, and/or the like. In a basic, simple example, a single generated content may have a corresponding single hash value which represents the single generated content. Generally, a generated content will have multiple hash values (e.g., a set or collection of hash values) which represent the single generated content. For example, if the generated content was a generated image, then the image may be divided into multiple parts and each part assigned a hash from one or more hashing algorithms or models, thereby the generated image is represented by the set of hashes defined to each part of the generated image. This unique set of hashes may optionally be fed into a statistical or machine learning or artificial intelligence model to produce a single unique identifier. If, for example, the generated content is generated text, then the text can be divided into tokens, or chunks for phrases contained in the content, and then each chunk can be assigned a hash value.

A collection of hash values which represent a generated content 111 from a generation service 110 may be referred to as a "content group." When a generating service 110 generates new content 111, GenAI CVX 200 simultaneously creates content group hash data associated with the received generated content. Each submission to GenAI CVX 200 can be stored as a related content group and each hash may be independently searchable at a global datastore level. GenAI CVX 200 may utilize one or more databases for storing the plurality content groups associated with the received content from various generating services 110. The system may also opt to store originally submitted content. In an embodiment, the hashes may be derived from some sort of known metric such as Levenshtein distance and image similarity scoring methods. In an embodiment, perceptual hashing (phash) is implemented. In an embodiment, locally sensitive hashing (LSH) is implemented. There are several variants of phash and LSH that may be implemented according to various aspects, but the idea is that small changes in the input will have a small change on the output. For example, if there was an image of a child riding a blue bike and another image of that is identical but with a red bike, a phash or LSH would yield two outputs that are very close by edit difference (e.g., ABCDE and ABCDD). With a low edit distance (1 in the previous example) the two inputs would be considered "similar". Edit distance measures the minimum number of operations (insertions, deletions, substitutions) needed to transform one sequence into the other. In practice the threshold for what content is considered to be "similar" is part of the implementation decisions.

The exchange may be centrally located with a third party (public or private) or provided by the generating service directly. This can allow for the verification of whole pieces of content that have not been modified. In some implementations, GenAI CVX can verify content embedded in other content or otherwise modified (additive or subtractive to some extent). Using a combination of random sampling and part identifiers, GenAI CVX can perform granular content verification to identify embedded content. For example, a specific melody of an input music sample may be identified and isolated from the other melodies and encompassing song altogether, wherein the specific melody may be a registered content.

GenAI CVX 200 can provide content verification. When an external party wants to check if content is possibly generated by AI, they can submit the content 120 to GenAI CVX 200 for verification. According to an embodiment, during verification GenAI CVX 200 may break up the input content 120 (e.g., image or text) into random parts (e.g., sub-images and phrases respectively), call candidate groups and compare hashes across the known corpus of submitted content at the global datastore level. If there is a match for any of the hashes, then the entire collection of submitted hashes would then be compared against the content group submitted by the generating service 110. This allows GenAI CVX 200 to produce a match or similarity/verification score 130 based on the hashed data across the group. A higher score across the group would indicate a higher likelihood that the input content 120 was generated as part of the original submission.

Figure 2:
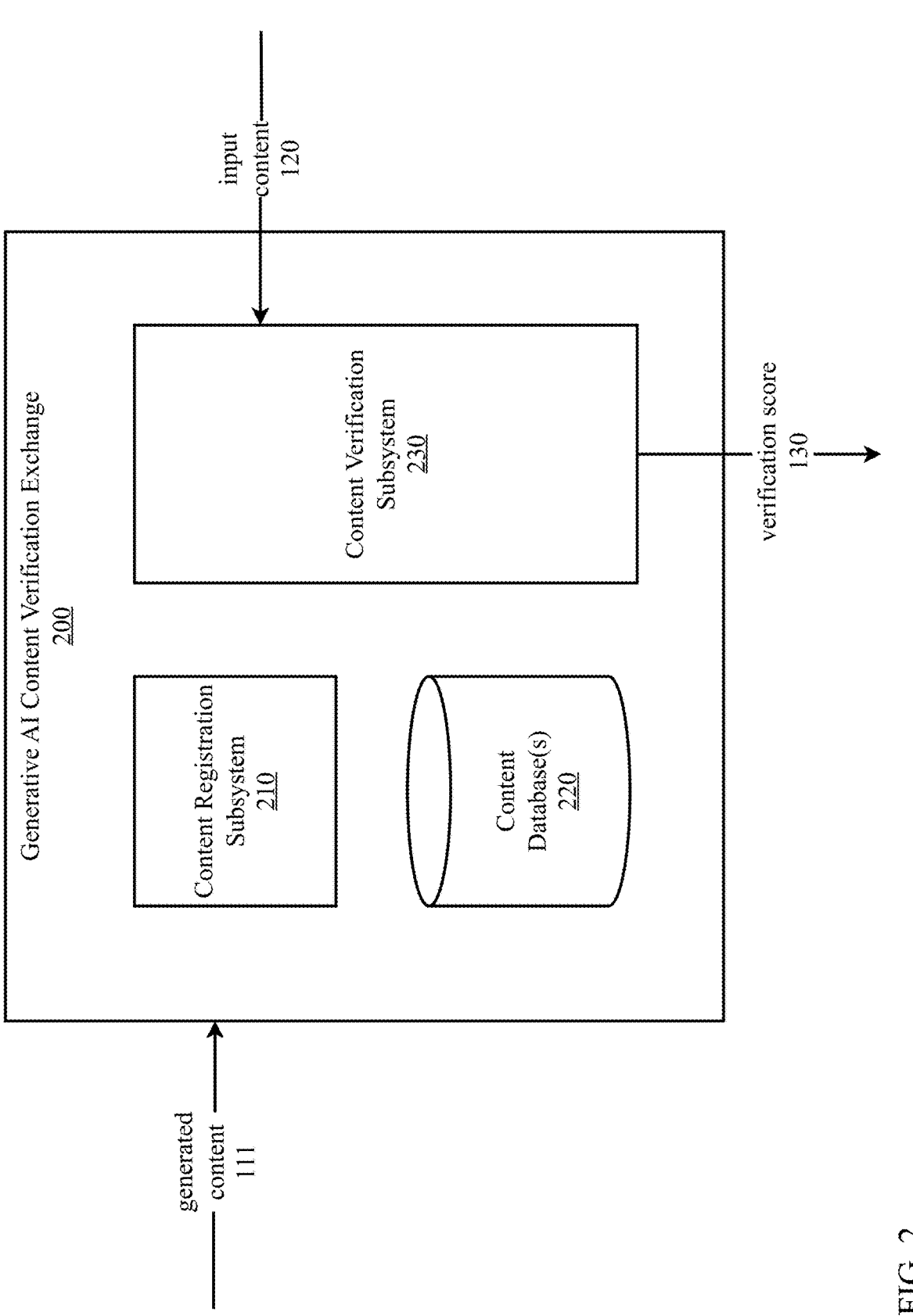
FIG. 2 is a block diagram illustrating an exemplary embodiment of a generative artificial intelligence content verification exchange.

FIG. 2 is a block diagram illustrating an exemplary embodiment of a generative artificial intelligence content verification exchange 200. According to the embodiment, GenAI CVX 200 may receive generated content 111 which was generated by a generation service 110. The received generated content 111 may be processed by a content registration engine 210 configured to prepare the received content for storage in content database(s) 220. An image may be used in FIG. 2 as an exemplary generated content 111 received by GenAI CVX 200. Content registration engine 210 may be configured to create content group hash data associated with submitted content 111. The content group hash data may comprise a plurality of hash values which represent content generated by generation service 110.

Content registration engine 210 may assign a unique content group identifier (CGID) to the received image. Content registration engine 210 may then break the image into a plurality of parts (e.g., "data chunks" or "chunks") $P_i$. The function/process that breaks the image into parts may vary and it may not necessarily yield uniform parts. As a simple example, an image may be broken down into four parts which represent four different quadrants of the image. In some implementations, the content may be divided into smaller parts randomly. In some implementations, image content may be processed via image segmentation techniques such as, for example, grid-based segmentation, quadtree decomposition, k-means clustering, edge based segmentations, region growing, superpixel segmentation, and/or the like. In some implementations, machine learning may be employed to determine how to break the content into smaller parts. For example, a machine learning model may be trained to break the generated content into a plurality of parts based on various features such as the type of generated content received (e.g., video, photo, illustration, music, artwork, text, speech, endorsement, etc.), the generating service which generated the content, the prompt associated with the generated content, metadata associated with the generated content, historical data chunking information. In some implementations chunks may overlap with each other to provide more robust identification when transforms such as noise layers, scaling, or rotation have been applied. In an embodiment, system 200 may implement adaptive chunking algorithms that optimize the size and distribution of content segments based on the type and complexity of the media (e.g., music, video, images, text). In other implementations, the system may use advanced sampling techniques, such as perceptual audio and video hashing, that capture the unique characteristics of each content segment while being robust to common transformations and distortions. In other implementations, system 200 can utilize machine learning models, such as convolutional neural networks (CNNs) and recurrent neural networks (RNNs), to learn and extract meaningful features from the content segments, enabling more accurate similarity detection and matching, and be more robust to scaling, rotations, chunk order, and other transformations. Similar content may also be optionally returned to enable iterative search, refinement or investigation by users, AI agents or applications for one-time viewing or for selection and iterative refinement or expansion of search parameters.

In various embodiments, content may be registered by creators, viewers, editors, purchasers, distributors and the system may optionally provide for direct or indirect (e.g., referrals) remuneration for providing, labeling, commenting on, or utilizing (whether for specific comparisons or analysis or in the process of training, fine-tuning, or augmenting a model directly or via a RAG or similar).

Content registration engine 210 can transform each of the plurality of smaller parts $P_i$ into a part identifier $P_i'$ with a one-way function such that:

$$T(P_i)=P_i'$$

where function T is some method for assigning an identifier (e.g., a hashing algorithm or machine learning model). Content registration engine 210 may then store the content ID and part identifiers in content database(s) 220. The data stored in content database(s) 220 may be used by content verification engine 230 to facilitate AI content verification of input content or relevance to a declared topic of interest.

According to some embodiments, content registration subsystem 210 may comprise crawling infrastructure configured to crawl across content providers, the Internet, and other information sources and automatically logs into the system with a record of the first known instance of the content and optionally track additional presentation of content at unique distribution locales. Unlike existing initiatives that rely on content creators to actively embed manifests or metadata into their content, the proposed system includes a proactive content registration and indexing system with temporal dynamics and quality metrics. This system continuously crawls and indexes content from various sources, creating a comprehensive database of registered content that can be used for real-time verification and similarity detection, even for content that may not have been explicitly registered by its creator(s) or distributors. This enables a global corpus of AI generated content and traditional content to be more clearly captured, categorized and explored. This archival component is analogous to the Internet Archive crawler but enhanced with additional reference and content quality data, probabilistic selection data, applied classifications information, and GenAI content scoring and verification exchange information tied in. In an implementation, an algorithm similar to PageRank or the temporally enhanced PageRank may be implemented against the resulting clusters as determined by the fingerprinting on individual assets as well as their semantic vector space interpretations and/or the relationship graph and/or a knowledge graph of indexed content. As an example, the system's content categorization, characterization, and segmentation methods can provide more accurate and comprehensive data for ranking and rating content compared to traditional PageRank algorithms. In some implementations, the system can incorporate user, application, or AI agent preferences and selections to generate probabilistic scores for content relevance and quality. This can help rank content based on its likelihood of being chosen for specific use cases, such as downstream inclusion in datasets, direct presentation to users, playback or engagement, or augmenting AI engine prompts. This may leverage the system's ability to capture content quality, provenance, creator information, temporal data, and paid or sponsored content to help mitigate issues like search engine optimization (SEO) manipulation, low-quality machine-generated content, and content sampling/reposting that currently affect PageRank and similar algorithms. These capabilities are important for addressing these shortcomings in current search engines and content ranking systems, as AI-generated content becomes more prevalent and potentially obscures the usability and relevance of web and other e-accessible content.

GenAI CVX 200 can verify if input content 120 is content which was created by a generative AI service or includes known stenographic signatures. Verification could be time or event triggered. For example, it may be manually triggered by the end user or as a part of an automated process integrated into user interfaces such as browsers and content curation systems. Continuing with an image as the content to be verified, content verification engine 230 can receive input content 120 which is to be compared with stored hash values to determine if the input content was generated by an AI generation service. The input content 120 may be received by content verification engine 230 and broken into random parts $P_i$. Each $P_i$ is transformed into a part identifier $P_i'$. Next, the content database(s) 220 is checked for part identifier $P_i'$. If $P_i'$ is found in content database(s) 220, then content verification engine 230 can compute a match score for that content group. For example, the match score could be a simple percentage or other more complex scoring method. The process may iterate through the content database(s) until all matched part identifiers have been exhausted. This system has both affirmative value when input content 120 does appear in content database(s) 220 and must simultaneously contend with the issue of when content does not appear in the content database(s) 220. In these cases, referred to as non-registered content, there is no original "claimed" content submission. Thus, a comparative request or verification request adds the input content to the broader database.

In some embodiments, GenAI CVX 200 may implement automated checking of AI-generated content with a user's session and provide real-time scoring. This may be implemented by integrating GenAI CVS 200 systems into user interfaces such as browsers or content curation systems. For example, the system may utilize a browser extension or plugin that integrates with the user's web browser (e.g., Chrome, Firefox). The extension may have access to the current web page's content and be able to communicate with GenAI CVX 200 system. When the user visits a web page, the browser extension extracts the content from the page, including text, images, and other relevant elements. The extracted content is prepared for verification by GenAI CVX 200. The browser extension sends the extracted content to GenAI CVX 200 for verification. Content verification engine 230 receives the input content 120 and proceeds with the verification process as described herein. The content verification engine breaks the input content into random parts and transforms each part into a part identifier. It then checks the content database(s) for matches with the part identifiers. According to an aspect, if matches are found, the content verification engine computes a match score for each content group based on the percentage of matched part identifiers or using a more complex scoring method. The content verification engine can send the verification results and match scores back to the browser extension. The browser extension processes the results and provides real-time feedback to the user within their browsing session. This feedback can include a score indicating the percentage or proportion of AI-generated content on the currently viewed web page. The browser extension can display the AI-generated content score in a user-friendly manner, such as a visual indicator or a summary report. The score can be updated dynamically as the user navigates through different web pages during their session. If the input content does not appear in the content database(s), the system treats it as non-registered content. In such cases, the browser extension can prompt the user to submit the content for registration or automatically add it to the content database(s) for future reference.

The larger the hash group originally submitted by the generating service 110, the more accurate the verification could be since there would be a larger pool of hashes to compare against for any given content group. Since sampling can occur within different "scopes" associated with work, the random selection of candidates can help to reduce gaming the system by modifying small parts of the content such as trimming the edges of an image or changing small portions of text (e.g., changing happy to glad or one note in a melody). Multiple measures of distance across the associated hypercube can be generated. Distance between vectorized representations of different measures associated with various content pieces can be compared. Optional visualizations of the multiple dimensions can be projected to two-dimensional space by methods such as Principal Component Analysis (PCA), t-distributed stochastic neighbor embedding (t-SNE), Chinese restaurant process, and then can be combined with various clustering methods such as k-means, nearest neighbor, Balanced Iterative Reducing and Clustering using Hierarchies (BIRCH), or Density-Based Spatial Clustering of Applications with Noise (DBSCAN), to aid users in understanding similarity between content.

According to the embodiment, content database(s) 220 may employ one or more data storage devices and/or systems. In an embodiment, relational databases like MySQL, PostgreSQL, or NoSQL databases like MongoDB, DynamoDB, DocumentDB may be implemented for efficient storage and retrieval. In some implementations, content database(s) 220 may comprise one or more vector databases configured to store embeddings (sometimes referred to herein as encodings) of input content. In such an embodiment, one or more embedding models may be used to create representational embeddings (i.e., vectors) for input content. In some embodiments, content database may be implemented as a centralized database. In some embodiments, content database may be implemented as a distributed database. In an embodiment graph databases, e.g., Neptune or Neo4j, may be used to capture relationships between unique hashes representing content elements and subgraphs may be used alongside semantic similarity measures to compute potential neighborhoods or clusters of similarity on at least one, even a collection, or a computed score based on them which may also be directly or indirectly generated based on semantic similarity metrics based on vector distance. Graph databases may be leveraged to improve the capture of relational information directly or as knowledge graphs with formal ontologies specified via OWL, RDF or similar.

With respect to breaking the content into smaller chunks of bits and then fingerprinting (e.g., assigning part identifiers) them individually, sampling approaches can be used individually or collectively to reduce the likelihood of false negatives or false positives. In an embodiment, this may be varied as a function of the content's value against an objective function (e.g., monetary value of a key work—like the Mona Lisa or a critical bit of content such as a State of the Union Address). For images or audio in particular this kind of approach can be more robust when considering basic transformations (e.g., resizing, cropping, noise reduction, etc.).

In an implementation, content registration subsystem 210 may be further configured to perform optional categorization of various "categories" of content. For example, foreign policy related statements (e.g., trade, war, etc.) might be category one and require several different measures to establish veracity in order to be reported on by responsible news agencies, whereas a social media post about the comings and goings of an average citizen could be a category 10 and require little, if any analysis.

According to some embodiments, content registration subsystem 210 may be configured with extension for brand and trademark infringement. According to an embodiment, subsystem 210 may implement image and video recognition algorithms to automatically detect and flag potential instances of brand, trademark, patent, and design patent infringement within the registered content. System 200 may further integrate with existing intellectual property databases and registries to enable real-time scanning and comparison of submitted content against protected assets.

According to some embodiments, content registration subsystem 210 may be configured to provide liability and privacy considerations. System 200 may implement secure, encrypted storage and transmission protocols for all registered content and associated metadata, ensuring the privacy and confidentiality of user data. In some embodiments, the system can provide granular access control mechanisms that allow content owners to selectively share or restrict access to their registered content based on predefined policies and permissions. In an embodiment, the system can integrate with decentralized identity systems, such as self-sovereign identity (SSI) platforms, to enable users to manage their digital identities and control the level of attribution associated with their registered content. The system may implement zero-knowledge proof mechanisms to allow users to prove ownership or authorship of content without revealing their full identity, providing a balance between privacy and accountability.

According to an aspect of an embodiment, system 200 can leverage federated learning techniques that allow multiple parties (e.g., content creators, hosting platforms, regulatory bodies) to collaboratively train and refine content classification and similarity detection models without sharing raw data across jurisdictional boundaries. This may involve developing interoperability standards and protocols that enable seamless integration and data exchange between different national or regional content registration systems, while respecting local laws and regulations. In an implementation, the system may utilize smart contract-based governance mechanisms that allow stakeholders to define and enforce content registration policies and dispute resolution procedures in a transparent and auditable manner, even in the face of conflicting national interests or political constraints.

According to an embodiment, system 200 can extend the content registration platform to support the sharing of threat intelligence and incident data, leveraging existing standards such as STIX/TAXII, while addressing their limitations and challenges in a multipolar world. The system may develop decentralized reputation systems and trust frameworks that enable organizations to assess the credibility and reliability of content and evidence shared across different jurisdictions and legal systems. For example, the system can integrate with blockchain-based provenance tracking and verification mechanisms to ensure the integrity and immutability of content-related evidence, even in the face of competing national interests or conflicting standards of proof.

Figure 3:
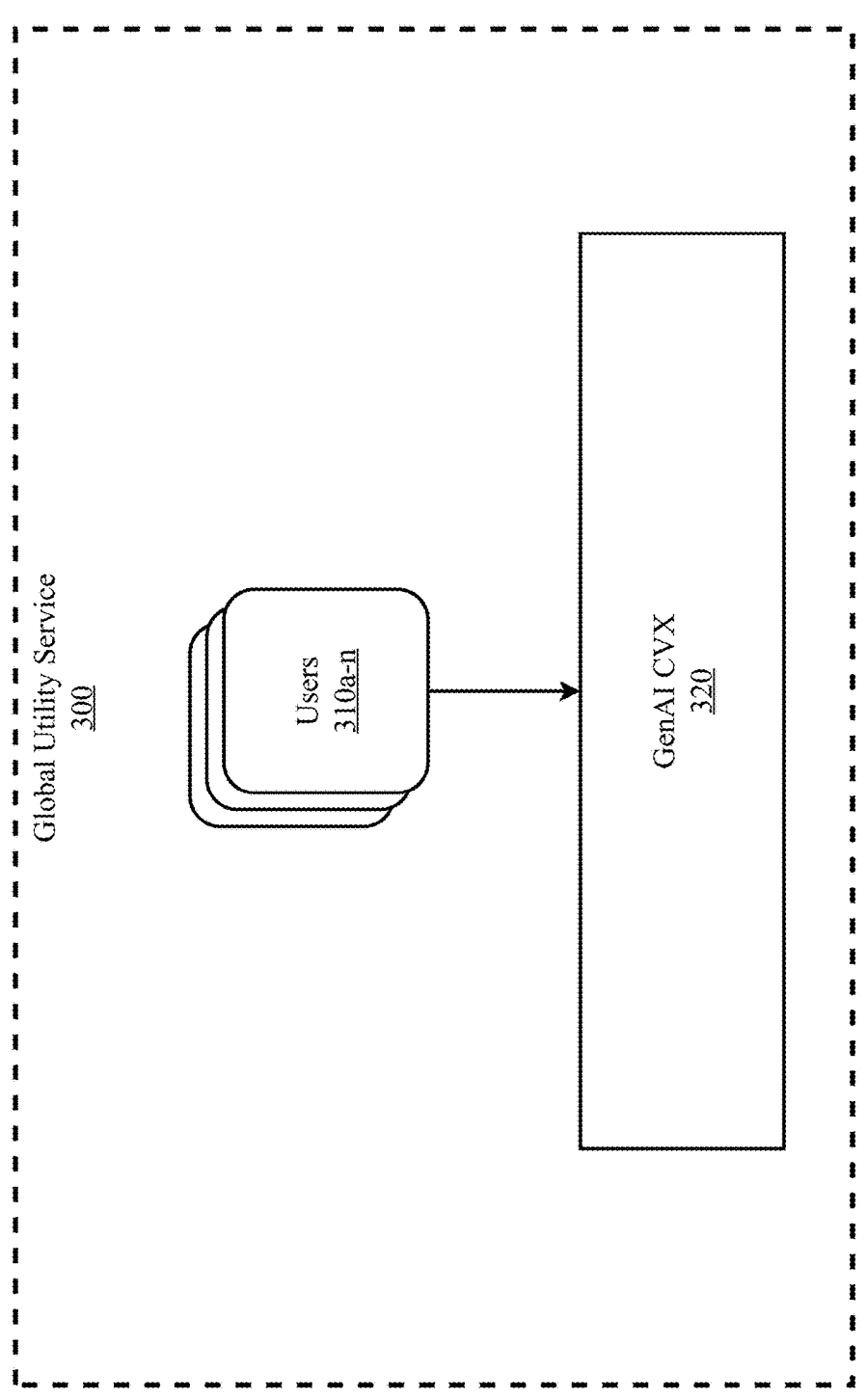
FIG. 3 is a block diagram illustrating an exemplary system architecture for providing public content registration to a global utility service using a generative artificial intelligence content verification exchange, according to an embodiment.

FIG. 3 is a block diagram illustrating an exemplary system architecture for providing public content registration to a global utility service using a generative artificial intelligence content verification exchange, according to an embodiment. A single global utility service 300 with public content registration refers to an online platform or service that serves as a universal utility for users worldwide. This service allows users 310*a-n* to register and share content, and the shared content is publicly available for others to view. Examples of platforms that provide global utility services include Facebook and Twitter, where users from around the world can share various types of content and engage with the public or a specific audience.

According to the embodiment, a global utility service 300 with a plurality of users 310*a-n* is present and comprises a GenAI CVX 320 configured to receive content created by the plurality of users 310*a-n* and register the content according to various methods described herein.

Figure 4:
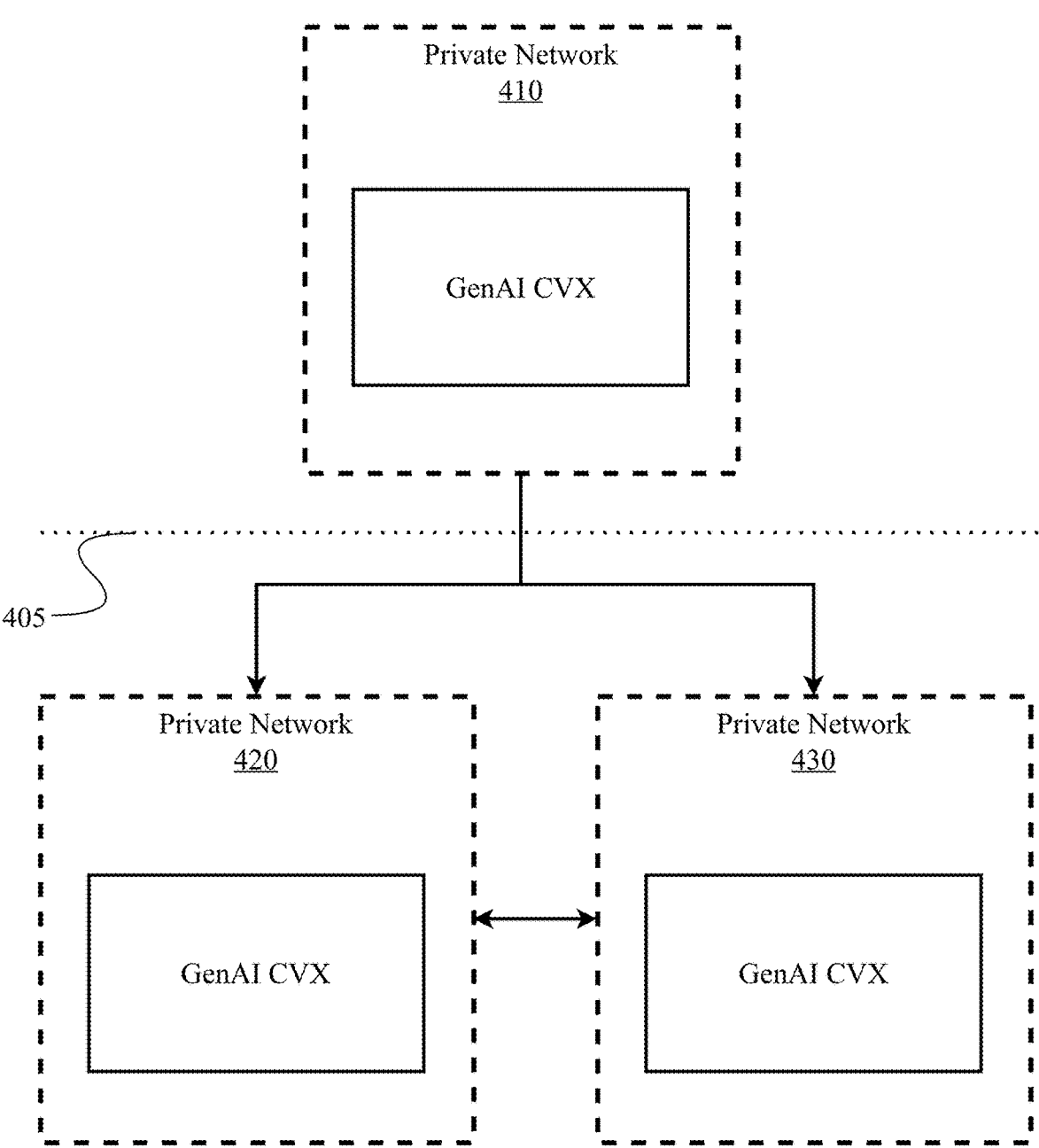
FIG. 4 is a block diagram illustrating an exemplary system architecture for collaborative generative artificial intelligence (AI) content identification and verification with private networks, according to an embodiment.

FIG. 4 is a block diagram illustrating an exemplary system architecture for collaborative generative artificial intelligence (AI) content identification and verification with private networks, according to an embodiment. According to the embodiment, the system may comprise two or more private networks 410, 420, 430 which may also be referred to herein as "private enclaves". Private enclaves refer to isolated and restricted spaces or networks that are separate from the public or general-purpose networks. These enclaves are designed to provide higher level of security and control over the information within them. This embodiment is composed of multiple interconnected but independent entities or networks. These entities may cooperate and share information while maintaining a degree of autonomy. According to the embodiment, the private networks may comprise a hierarchy or otherwise be arranged such that each private network does not necessarily have access to information stored in a different private network. For example, consider that each private network has its own clearance level, wherein private network 410 possesses top level clearance and may access all information stored in lower clearance level private networks. A line 405 delineates the varying levels of access which may be present in an arrangement of private networks. Continuing the example, private networks 420, 430 may belong in a lower clearance level and may only have access to each other and any other private networks with the same level of clearance.

According to the embodiment, each of the private networks 410, 420, 430, may comprise a GenAI CVX configured to register and store content associated with its respective private network. Only private networks with the proper clearance/access level would be able to search, match, and/or verify the stored, registered content contained within other private networks. In such embodiments, during content lookup, the GenAI CVX will first do a local search of the content database(s) located within that instance within the private network, and then move on to other linked private networks and search against their content databases. For example, private network 410 may first compare input content against registered content within its own database and then move down to subordinate private networks 420 and 430 to search against their content databases.

Figure 5:
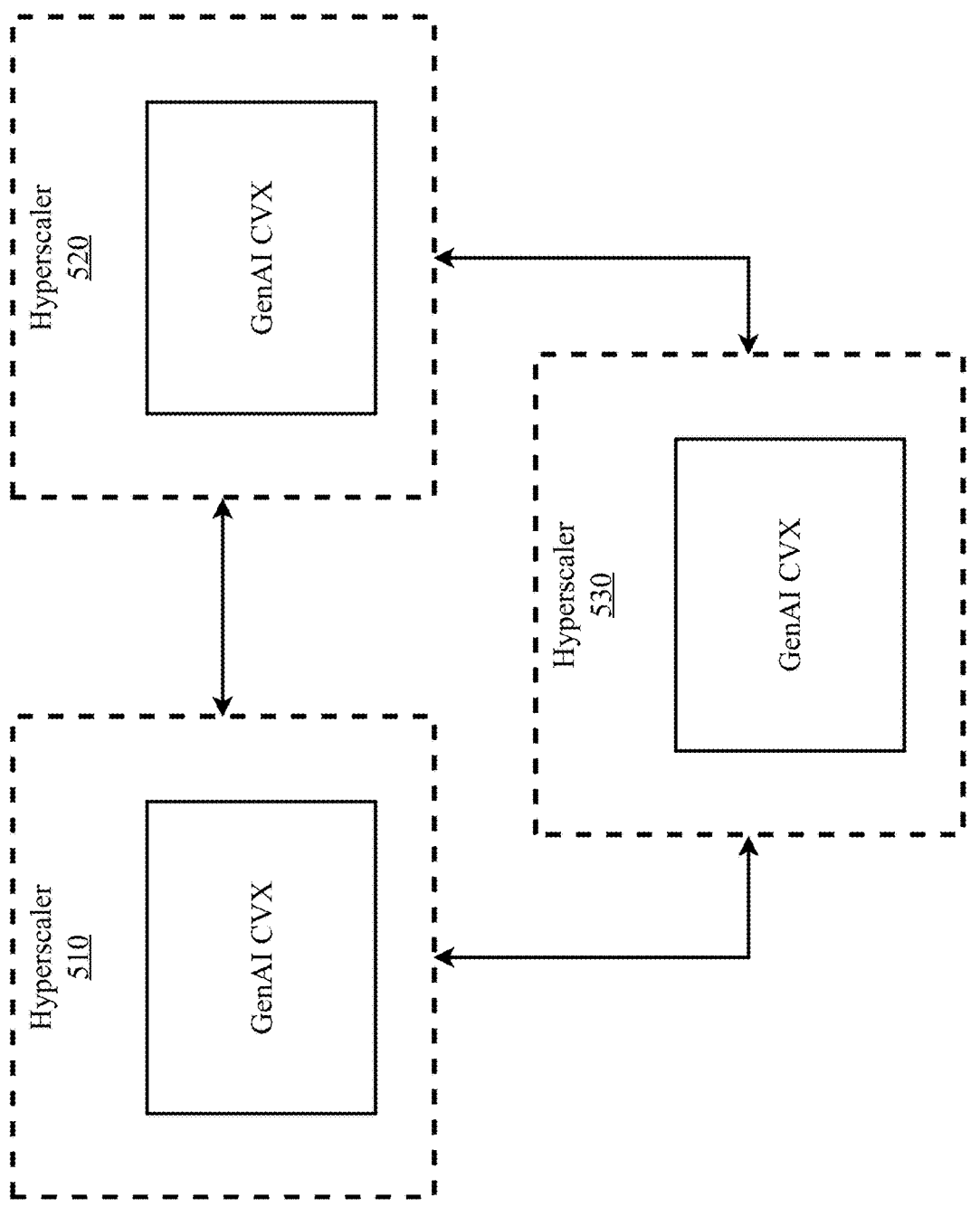
FIG. 5 is a block diagram illustrating an exemplary system architecture for collaborative generative artificial intelligence (AI) content identification and verification using a federated architecture.

FIG. 5 is a block diagram illustrating an exemplary system architecture for collaborative generative artificial intelligence (AI) content identification and verification using a federated architecture. According to the embodiment, the system may comprise a plurality of entities arranged in a federated architecture wherein each of the entities may maintain autonomy but allows these different isolated environments to collaborate with limited information exchange. As illustrated exemplary entities are represented as three separate hyperscalers 510, 520, and 530. Hyperscalers are large cloud service providers, which can provide services such as computing and storage at enterprise scale and may comprise a large network of data centers. Exemplary hyperscalers may include Microsoft Azure, Amazon Web Services, and Google Cloud Platform.

According to the embodiment, each hyperscaler may employ a GenAI CVX configured to compile and maintain a registry of content associated with that particular hyperscaler. For example, a generation service 110 that utilize a hyperscaler's services, such as computing resources for generative AI processing, can have its content registered with the GenAI CVX associated with that hyperscaler. Due to the federated nature of these entities, there is limited information exchange between and among entities. However, limited information may be exchanged to support mutual verification. For example, a hyperscaler may implement private keys to facilitate information exchange.

Figure 9:
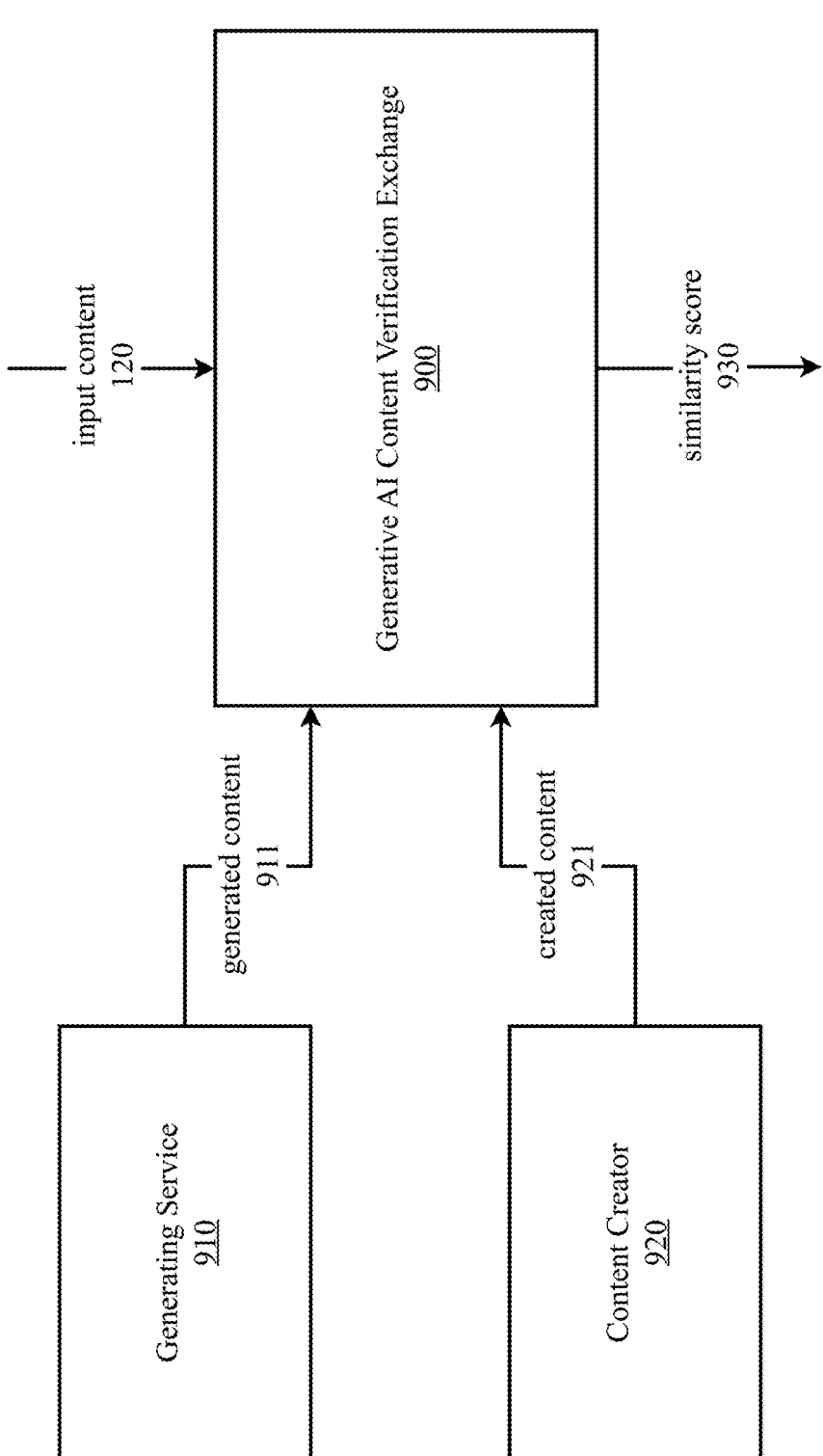
FIG. 9 is a block diagram illustrating an exemplary system architecture for collaborative generative artificial intelligence (AI) content identification and verification, according to another embodiment.

FIG. 9 is a block diagram illustrating an exemplary system architecture for collaborative generative artificial intelligence (AI) content identification and verification, according to another embodiment. According to the embodiment, the system comprises one or more generating services 910 which can employ various generative artificial intelligence systems and/or models to generate a plurality of content including, but not limited to, images, illustration, photo, multimedia, podcast, music, endorsement, artwork, video, audio, text, and computer programming instructions (i.e., software code). A generating service 910 may receive a prompt to generate content from a user and present the generated content 911 to the user or to a downstream application or process. Examples of generation services which may be integrated with the generative AI content verification exchange 900 include OpenAI's GPT, Midjourney, BERT, StyleGAN, DALL-E, WaveGAN, Deepfake, and/or the like.

Each generating service 910 is configured to send generated content 911 to a generative AI content verification exchange (GenAI CVX). GenAI CVX 900 may create collection of hashes to represent the generated content. In an embodiment, the collection of hashes may additionally represent select metadata associated with the generated content. For example, metadata can include device identifiers, IP address, MAC address, IEINs, and/or the like. In a basic, simple example, a single generated content may have a corresponding single hash value which represents the single generated content. Generally, a generated content will have multiple hash values (e.g., a set or collection of hash values) which represent the single generated content. For example, if the generated content was a generated image, then the image may be divided into multiple parts and each part assigned a hash, thereby the generated image is represented by the set of hashes defined to each part of the generated image. If, for example, the generated content is generated text, then the text can be divided into chunks for phrases contained in the content, and then each chunk can be assigned a hash value. In embodiments where the generating service 910 creates a collection of hashes to represent a generated content, the hash function(s) used to create the collection of hashes may be shared between the generating service and GenAI CVX 900, wherein GenAI CVX 900 can utilize the shared hash function(s) to create hash values for input content 120 during content similarity and/or verification processes. The use of a shared hash function may be applied to content creators 920 as well in various implementations.

A collection of hash values which represent a generated content 911 from a generation service 910 may be referred to as a "content group." When generating service 910 generates new content 911, GenAI CVX 900 simultaneously creates content group hash data associated with the received generated content. Each submission to GenAI CVX 900 can be stored as a related content group and each hash may be independently searchable at a global datastore level. GenAI CVX 900 may utilize one or more databases for storing the plurality content groups associated with the received content from various generating services 910. In an embodiment, the hashes may be derived from some sort of known metric such as Levenshtein distance and image similarity scoring methods. In an embodiment, perceptual hashing (phash) is implemented. In an embodiment, locally sensitive hashing (LSH) is implemented. There are several variants of phash and LSH that may be implemented according to various aspects, but the idea is that small changes in the input will have a small change on the output. For example, if there was an image of a child riding a blue bike and another image that is identical but with a red bike, a phash or LSH would yield two outputs that are very close by edit difference (e.g., ABCDE and ABCDD). With a low edit distance (1 in the previous example) the two inputs would be considered "similar". In some implementations, the generating service 910 may be configured to create, for each piece of generated content, a set of hash values which represents the generated content and submit this set of hash values as a content group to GenAI CVX 900 for processing and storage in a content database. The set of hash values (whether created by the generating service, content creator, or GenAI CVX) effectively acts as a fingerprint for the generated content which can then be granularly searched and compared against during content similarity and/or verification processes as described herein.

Present in this embodiment is one or more content creators 920 which may create and submit created content 921 to GenAI CVX 900, wherein the created content can include the following (non-limiting) set of images, illustrations, photos, multimedia, academic work, podcast, music, endorsement, artwork, video, audio, text, and computer programming instructions (e.g., code). Generally, content creator 920 is any one or more people who create content. Content creator 920 may be an individual person (e.g., a wildlife photographer, a solo musician, etc.), or a group of people (e.g., a symphony, a research team, the cast of a play, etc.). In an implementation, content creator 920 may, for each piece of created content, create a set of hash values which represents the created content and submit this set of hash values as a content group to GenAI CVX 900 for processing and storage in a content database. In such an embodiment, the content creator 920 and GenAI CVX 900 may implement a shared hash function(s) as previously described. An exemplary use case involves a musical artist submitting their musical catalog to GenAI CVX 900 as a large set of hash values, wherein the large set of hash values is stored as a single content group. In this example, the single content group may comprise a plurality of which can compare input content 120 against stored copyrighted content. Content groups representing created content 921 is stored in content database 220.

The exchange may be centrally located with a third party (public or private) or provided by the generating service directly. This can allow for the verification of whole pieces of content that have not been modified. In some implementations, GenAI CVX can verify content embedded in other content or otherwise modified (additive or subtractive to some extent). Using a combination of random sampling and part identifiers, GenAI CVX can perform granular content verification to identify embedded content. For example, a specific melody of an input music sample may be identified and isolated from the other melodies and encompassing song altogether, wherein the specific melody may be a registered content.

GenAI CVX 900 can provide content similarity and/or verification capabilities. When an external party wants to check if content is possibly generated by AI or a content creator 920 or otherwise is registered content stored in a content database, they can submit the content 120 to GenAI CVX 900 for verification. According to an embodiment, during content similarity and/or verification GenAI CVX 900 may break up the input content 120 (e.g., image or text) into random and/or pseudorandom parts (e.g., sub-images and phrases respectively), call candidate groups and compare hashes across the known corpus of submitted content at the global datastore level. If there is a match for any of the hashes, then the entire collection of submitted hashes would then be compared against the content group submitted by the generating service 110. This allows GenAI CVX 900 to produce a match or similarity/verification score 930 based on the hashed data across the group. A higher score across the group would indicate a higher likelihood that the input content 120 was generated as part of the original submission.

Figure 10:
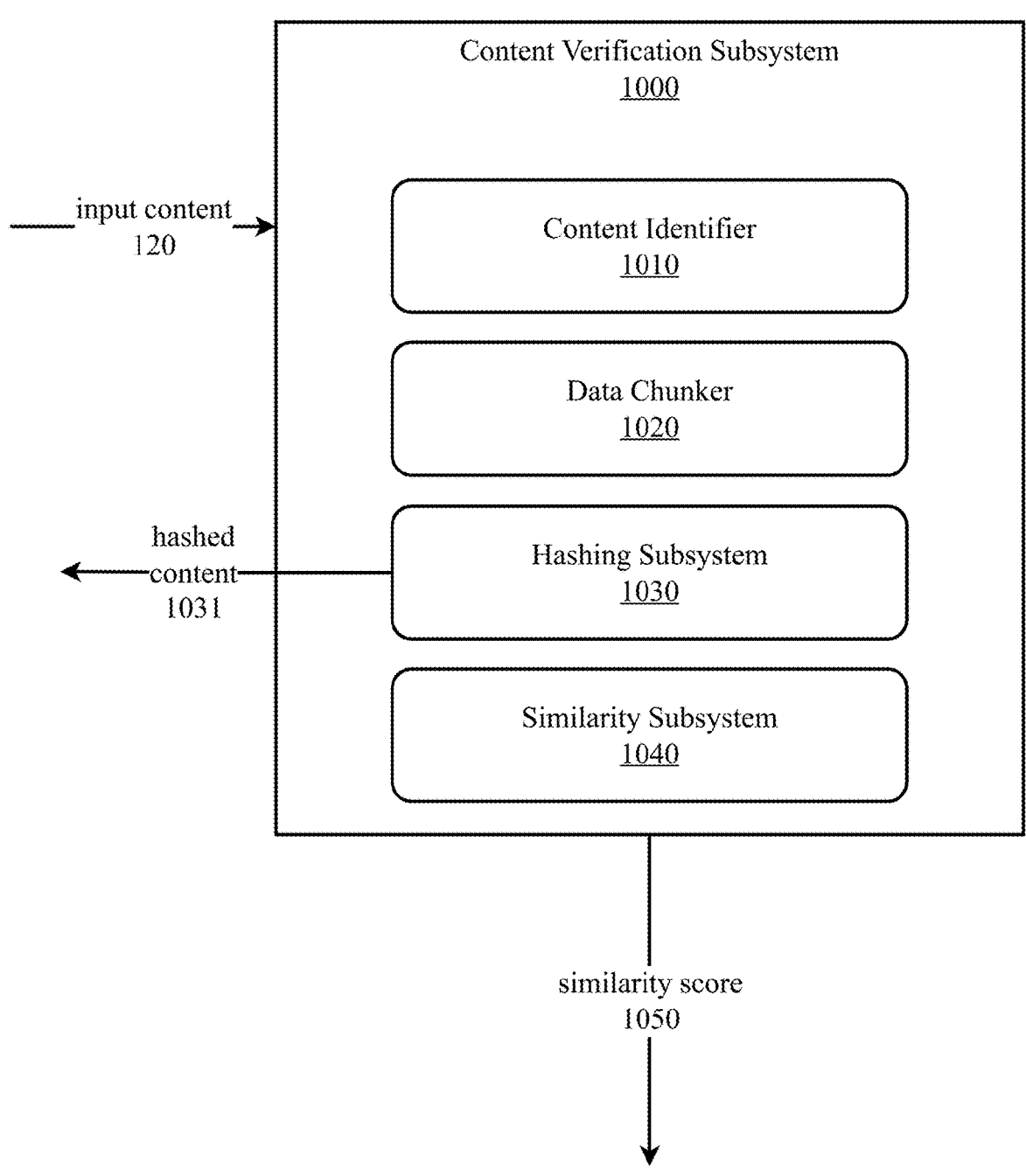
FIG. 10 is a block diagram illustrating an exemplary embodiment of an aspect of GenAI CVX, a content verification subsystem.

FIG. 10 is a block diagram illustrating an exemplary embodiment of an aspect of GenAI CVX, a content verification subsystem.

According to the embodiment, content identifier 1010 is present and configured to receive input content 120 which has been submitted to GenAI CVX 900 in order to determine if the input content 120 is similar to, or using components of, registered content stored in content database 220, wherein the registered content comprises a massive corpus of generated content 911 and created content 921, wherein the massive corpus comprises a plurality of content groups. Content identifier 1010 receives input content and analyzes the content to identify a content type such as, for example, image, text, or audio content, to name a few. Determining the type of media for received content can be achieved through content analysis and identification techniques.

Methods for identifying whether the content is an image, text, audio, or another type of media can include, but are not limited to, file type inspection (e.g., examining the file extension to infer the type of media), analyzing the initial bytes of the file (e.g., magic bytes or file signatures) as different file types have unique signatures, text analysis algorithms, machine learning classification (e.g., train machine learning models to classify content types by using supervised learning with a labeled dataset containing examples of different media types), leveraging external application programming interfaces (APIs) or services that specialize in media type detection, audio signal processing, and natural language processing (NLP) to analyze the linguistic structure of the content. By combining multiple methods or using a combination of heuristics and machine learning, content identifier 1010 can create a robust system for determining the type of media for received content. The choice of method depends on the specific requirements and characteristics of the embodiment.

In some embodiments, the type of hash function used to create a set of hash values for received input content may be selected based on the content type identified by content identifier 1010. For example, if the input content is identified as an image, then a hashing function such as perceptual hashing may be used to generate hash values, whereas if instead, the input content is identified as text, then the hashing function such as LSH may be used to generate hash values. In this way, GenAI CVX 900 can use specific hash functions to generate content groups for submitted generated content 911 and created content 921 for specific types of submitted content, wherein the same specific hash functions can be used by content verification subsystem 1000 when processing input content 120. In an embodiment, hashing subsystem 1030 may select a hashing function from a plurality of hashing functions based on the content type identification as received from content identifier 1010.

According to the embodiment, data chunker 1020 is configured to deconstruct content into a plurality of data chunks. The size of the deconstructed data chunks may be predefined, for example each data chunk may be 64 bits. The size of the data chunks may be based on the type of content being deconstructed, wherein the input content is identified prior to being deconstructed, and the result of the analysis is used to determine the size of the data chunks. Text data can be segmented into smaller parts using techniques such as tokenization or natural language processing methods. Tokenization breaks the text into individual words or phrases, providing smaller units for analysis. Image data can be divided into smaller parts using techniques like image cropping or segmentation, where specific regions of interest are extracted from the larger image. Audio content can be divided into smaller parts using techniques like windowing or segmentation, which involves breaking the audio signal into short, overlapping frames for hashing. For structured data, such as tables in a database, breaking the content into smaller parts might involve selecting specific rows or columns based on certain criteria. In an embodiment, the content is randomly deconstructed into a plurality of parts (i.e., data chunks). In an embodiment, the content is deconstructed into a plurality of parts, wherein the parts are determined using a fractal distribution.

While traditional image segmentation methods often rely on pixel-level or region-based techniques, fractals can be used as an alternative approach for image segmentation. Fractal-based image segmentation leverages the self-similarity properties of fractals to identify and delineate structures within an image. The process of implementing a fractal distribution for deconstructing input content comprises the following general steps. Fractals exhibit self-similarity at different scales. By calculating the fractal dimension of an image or specific regions within an image, it can be possible to quantify the degree of complexity and self-similarity. Next, apply a threshold based on the fractal dimension to identify regions with distinct fractal characteristics. This can help separate objects or structures within the image. Then utilize the calculated fractal features to guide segmentation algorithms. For example, regions with similar fractal dimensions may be grouped together, contributing to the segmentation process. The Mandelbrot set and *Julia* sets, well-known fractal structures, can be used as seeds or guides for segmentation. For example, objects or structures in an image that exhibit similar patterns to these fractals may be considered part of the same segment.

In another embodiment, image content is pseudo-randomly deconstructed into a plurality of parts. A pseudo-random technique which may be implemented according to an aspect of an embodiment can include tessellation distribution. "Tessellation" refers to the process of covering a surface with a pattern of geometric shapes, such as tiles or polygons, without any gaps or overlaps. In other words, it involves creating a repeated arrangement of identical or similar shapes that completely fills a two-dimensional space, leaving no empty spaces in between. Each of these geometric shapes may be assigned a hash value or set of hash values, wherein the complete set of hash values for the image content represents a content group.

In yet another embodiment, one or more trained machine learning algorithms may be used to break the received input data into a plurality of parts (e.g., data chunks). The training process may involve providing the model with examples of how the data should be split, and the model learns to generalize from these examples. A training dataset may comprise a dataset where each instance represents an input data sample (e.g., an image, document, sequence). The training dataset can also include the desired output, indicating how the data should be split into parts. A next training step may include defining labels for the training data, representing the partitions or segments that the data should be divided into. Each label may correspond to a specific way of breaking the data. If applicable, represent the data in a format suitable for machine learning. For example, convert images to feature vectors or use embeddings for text data. Then the model can be trained using the labeled dataset and validated on separate dataset. In an embodiment, the machine learning algorithm may comprise a neural network.

The machine learning model may be selected based on the embodiment, and various configurations may be possible according to one more aspects. For example, the trained model may be trained using unsupervised techniques known to those with skill in the art.

Data chunker 1020 may send the input content, as plurality of deconstructed parts, to a hashing subsystem 1030 configured to apply one or more hashing functions to each part of the plurality of parts to generate a hash value or values for each part. The entire set of parts, each assigned a hash value, is referred to as a content group representing the received input content 120. The content group may be sent to content database 220 for storage. In some implementations, the content group is only stored in content database 220 if it is determined to not match and/or is similar to registered content already stored in content database 220. In such an embodiment, hashing subsystem may comprise a cache for temporary storage of a content group which is currently being processed as a component of a content verification and/or similarity query (e.g., a submission of content to GenAI CVX to verify content authenticity or to check for similarity with existing, registered content). For example, the input content may be an audio file comprising a song produced by a musician (i.e., content creator 920), wherein the song has been deconstructed and assigned a set of hash values stored as a content group in the memory cache of hashing subsystem 1030, the similarity subsystem 1040 determines that the song is not similar to any stored content in the content database 220 and, responsive to the determination, hashing subsystem 1030 can send content group 1031 from the cache to content database 220.

In some implementations, multiple sampling approaches can be used individually, or collectively, to reduce the likelihood of false negatives or false positives. For example, it might be beneficial to vary as a function of the content's value against some objective function (e.g., monetary value of a key work, like the Mona Lisa or some other critical bit of content). For images and audio in particular this kind of approach can be more robust when considering basic transformations (e.g., resizing, cropping, noise reduction, etc.).

Hashing subsystem 1030 may receive deconstructed content as either a stream of content, or as a batch comprising the totality of deconstructed parts associated with the input content 120. Hashing subsystem 1030 may utilize one or more hashing functions to generate hash values for deconstructed content. In some embodiments, the one or more hashing functions may be used on each deconstructed part of content, thus creating a set of values for a single part of content. In some embodiments, the one or more hashing functions used to generate the hash values may be selected based on the type of input content 120 received. In such an embodiment, content identifier 1010 may determine a content type associated with the received input content 120 and then send the result of the determination to hashing subsystem 1030 to be used when selecting a hashing function to apply to the received input content 120.

In an embodiment, hashing subsystem 1030 implements perceptual hashing for generating hash values for received content. Perceptual hashing, also known as content-based or visual hashing, is a technique used to generate a hash value or fingerprint from multimedia content, such as images, audio, or video, in a way that the hash is sensitive to perceptual similarity. The idea is that similar content should produce similar hash values, making perceptual hashing useful for tasks like image similarity search, copyright protection, and duplicate detection.

Perceptual hashing generates hash values for content in a way that similar content produces similar hash codes. In an implementation, edit distance can be applied to compare these hash values. If the edit distance between two perceptual hash codes is small, it suggests that the corresponding images are perceptually similar. Common perceptual hashing algorithms include pHash, dHash, and aHash.

In an embodiment, hashing subsystem 1030 implements locality-sensitive hashing (LSH) for generating hash values for received content. LSH typically uses hash functions to map data points into hash codes, with the goal of preserving the locality of similar points. In the LSH context, edit distance may be employed to compare hash codes or buckets. LSH aims to minimize the number of false positives (similar items mapped to the same bucket) and false negatives (dissimilar items mapped to different buckets). Edit distance serves as a metric to quantify the dissimilarity or similarity between these hash codes, providing a basis for measuring the effectiveness of perceptual hashing or LSH in preserving perceptual or structural likeness.

Locality-Sensitive Hashing is a technique designed for approximate similarity search in high-dimensional spaces. It's particularly useful when dealing with large datasets where finding exact nearest neighbors is computationally expensive. LSH works by mapping similar items to the same or nearby hash codes with high probability. Typically, LSH represents data points in a high-dimensional space, such as feature vectors for images or documents. Next, a family of hash functions that act as random hyperplanes or projections in the high-dimensional space is selected, wherein these hash functions are designed to be sensitive to the locality of data points. For each data point, hashing subsystem 1030 can apply the selected hash functions to obtain multiple hash codes (e.g., hash values or buckets). The goal is to map similar points to the same or nearby buckets with high probability. A next step can include organizing the data points into hash tables based on their hash values. Each table corresponds to a bucket, and each bucket contains the data points that share the same or nearby hash values. When querying for similar content, content verification subsystem 1030 can apply the same hash functions to the input content 120 and retrieve data points from the corresponding buckets in the hash tables. Similarity metrics may be used to refine the comparison/search process. Similarity subsystem 1040 can evaluate the exact similarity among the retrieved candidates to identify the true nearest neighbors. For example, Euclidean distance calculations may be performed for vectors to determine similarity.

In various embodiments, the one or more hashing functions implemented by content verification subsystem 1000 can include both perceptual hashing and LSH. In an embodiment, content registration subsystem 210 and hashing subsystem 1030 may use the same hashing functions, thereby registered content and input content is assigned a set of hash values using the same hashing functions and facilitating content verification.

Similarity subsystem 1040 is present and configured to receive a set of hash values from hashing subsystem, perform one or more comparisons against the registered content in content database 220, determine a verification/similarity score 1050 based on at least the one or more comparisons and/or one or more similarity metrics. Similarity metrics derived from Euclidean distance calculations and/or edit distance measurements may be used to determine a similarity score 1050. The similarity between two sets of hash values (e.g., two different content groups) or between two different hash values can be computed using various metrics including, but not limited to, Hamming distance, cosine similarity, Dice coefficient, Manhattan distance, and/or the like. The choice of similarity metric depends on the characteristics of the hash values and the context of the comparison. Different metrics may be more suitable for binary data, numerical vectors, or sequences. When working with hash values generated for specific tasks (e.g., perceptual hashing for images), it's essential to choose a metric that aligns with the intended measure of similarity for that task.

FIGS. 11A, 11B, and 11C illustrate an exemplary progression of deconstructing input image content, according to an embodiment. According to an embodiment, the exemplary progression involves repeatedly deconstructing the image into a plurality of parts based on a power of two, wherein the first stage of deconstruction involves splitting the input image into two parts, the second stage into four parts, the third stage into eight parts, and so on until a predetermined number of stages has been performed. It should be appreciated that the power of two progressions is simply exemplary and the progression may implement different power progression (e.g., power of 3). Although illustrated as having edges and similar areas and size, the parts need not be broken down into parts with straight or smooth edges and/or of the same size and shape.

FIGS. 11A, 11B, and 11C show an exemplary image 1100 which may be received as part of a content registration or content verification process. In either case, a received image may be deconstructed into a plurality of parts, or sub-images. As shown, FIG. 11A illustrates image 1100 as being deconstructed into two parts 1101*a-b*. These parts may then be assigned a hash value via one or more hashing functions as described herein. The hash values may be stored as a content group representing the image 1100. In the case of FIG. 11A, the content group consists of at least two hash values, one for each part 1101*a-b*. In some implementations, wherein each deconstructed part is assigned a set of hash values, such as in certain implementations of perceptual hashing functions, then the content group associated with FIG. 11A may comprise more than two hash values. The hash values of the content group may be organized into a hash table and stored in content database 220.

FIG. 11B illustrates image 1100 as being deconstructed into four parts 1102*a-d*. As shown, parts 1102*a* and 1102*c* represent the same sub-image as part 1101*a*. As such, the hash values for sub-images 1102*a* and 1102*c* will be similar to the hash value generated for sub-image 1101*a*. The hash values generated for sub-images 1102*a-d* may be stored as a content group representing image 1100.

FIG. 11C illustrates image 1100 as being deconstructed into eight parts or sub-images 1103*a-h*. As shown, sub-images 1103*a-b* and 1103*e-f* represent the same sub-image as part 1101*a* and sub-images 1102*a* and 1102*c*. As such, the hash values for sub-images 1103*a-b* and 1103*e-f* will be similar to the hash values for the previously mentioned sub-images from FIG. 11A and FIG. 11B. For simplicity, each of the eight sub-images may be assigned a hash value, wherein the eight hash values represent a content group. The content groups stored in content database 220 may be searched and compared against the known corpus of submitted, registered content at the global datastore level. If there is a match for any of the hashes (e.g., those associated with sub-images 1103*a-h*), then the entire collection of hashes associated with the deconstructed image is compared against the stored content groups which exhibited a match.

In some embodiments, GenAI CVX 900 can produce a similarity/verification score based on the hashed data across the content group. A higher score across the group would indicate a higher likelihood that the content was registered content and therefore generated content 911 or created content 921. For example, the image of FIG. 11B is submitted to GenAI CVX as created content 921 and stored as registered created content in content database 220 as content group comprising four hash values, one for each sub-image 1102*a-d*. Continuing the example, an external party submits an image for content verification, the image is deconstructed into eight sub-images as illustrated with 1103*a-h*, and wherein sub-images corresponding to 1103*a* and 1103*e-g* are taken directly from the registered content of image 1100 of FIG. 11B. When a comparison is done the content group comprising sub-images 1102*a-d* will have similarity with the content submitted by the external party. Because the registered content and the externally submitted content share similarity, specifically half the sub-images of the externally submitted content are found in the registered content, therefore content verification subsystem would generate a moderately high similarity score, indicating a high likelihood that externally submitted content is registered content.

The larger the hash group (i.e., the more parts the content is deconstructed into) submitted by the generating service or created by GenAI CVX, the more accurate the content verification can be since there would be a larger pool of hashes to compare against for any given content group. Since sampling can occur within different "scopes" associated with the work (as shown in FIGS. 11A-C), the random selection of candidates would help to reduce gaming the system by modifying small parts of the content such as trimming the edges of an image or changing small portions of text. The amount of data points (e.g., hash values) present in a content group determines the n-dimensional space that may be generated to perform comparisons and similarity measurements by a content verification subsystem. Multiple measures of distance across the associated hypercube can be generated. Distance between vectorized representations of different measures associated with various content pieces can be compared and the results used as a component of a similarity/verification score, according to some embodiments. Similarly, vectorized representations of content relationship graphs or characteristic graphs may be created by the system from the subgraph relevant to a given content chunk or content piece, and vector comparisons between such subgraphs for multiple pieces of content may be used to further corroborate or dispel content similarity using content and distribution and broader Internet or other references to said content pieces including temporal dynamics of their utilization post creation.

It should be appreciated that FIGS. 11A, 11B, and 11C also represent a series of data deconstruction on image 1100 using fractal distribution, according to an aspect. This is a simple example of a fractal distribution, wherein each iteration of data chunking uses the self-similarity properties of fractals to delineate sub-images of the image 1100.

Detailed Description of Exemplary Aspects

FIG. 6 is a diagram illustrating an exemplary content registration library 600, according to an embodiment. According to the embodiment, the content registration library 600 may be configured to store information associated with registered content. In some implementations, content registration library 600 may be stored in content database 220. In an embodiment, the registered content corresponds to content generated by one or more generating services which employ generative AI systems/models to produce content. The content produced by the one or more generating services may be sent to a GenAI CVX which can register the received content by assigning a content group to a received content, dividing the received content into a plurality of parts, assigning a hash value to each part, and storing the content group, the hash values, and the generating service in a content registration library 600.

As shown, content registration library 600 may act as a corpus of generated content associated with a plurality of generating services. In an embodiment, the library may store information associated with each part 605 of a received generated content. Each part may be assigned an identifier such as a hash value, and this part identifier may be stored in the library. Each part is linked to a content group 615, and a single content group may comprise a collection of hash values (i.e., part identifiers). Additionally, each registered part is linked to the generating service 625 which generated the original content submitted to GenAI CVX. In this way, each part may be individually searched, a content group may be searched, and a generating service may be searched at varying levels of granularity. In some embodiments, additional information such as metadata, or information related to the prompt associated with the submitted, generated content may be stored in library 600.

FIG. 7 is a flow diagram illustrating an exemplary method 700 for registering received content using a GenAI CVX, according to an embodiment. According to the embodiment, the process begins at step 701 when GenAI CVX 200 receives generated content from a generating service 110. In an embodiment, the received content is multimedia content, wherein the multimedia content may be generated by a generating service. At step 702, the submitted content is assigned a content group. This content group may be denoted by an unique identifier. The content group may act as a global identifier for any constituent parts or derivative content derived from the submitted content. As a next step 703, GenAI CVX can break the generated content into a plurality of parts. This may be achieved using various methods that may be dependent upon several factors including, but not limited to, the type of content being processed, the computing resources available, business rules or logic or some other constraints, and/or the like. An input image may be divided into smaller sub-images. An input text may be divided into smaller phrases. The content may be segmented into a plurality of data chunks. The data chunks need not be uniform in size or dimension.

As a next step 704, each part of the plurality of parts is assigned a part identifier. In an embodiment, the part identifier is a hash value determined by a hashing algorithm. In an embodiment, perceptual hashing may be implemented to assign part identifiers to each of the plurality of segmented parts. In an embodiment, locally sensitive hashing is implemented to assign part identifiers to each of the plurality of segmented parts. In an embodiment, the hashing algorithm may be implemented as a neural network model such as, for example, autoencoder-based hashing and/or Siamese network-based hashing. Autoencoders are unsupervised neural networks that learn to compress and reconstruct data. By training an autoencoder to reconstruct input data and using the bottleneck layer's activations as hash codes, they can create a hashing algorithm. The autoencoder learns to map similar inputs to similar hash codes, preserving the semantic similarity in the hash space. Examples of autoencoder-based hashing include Semantic Hashing and Deep Hashing. Siamese networks are neural networks that learn to compare and measure the similarity between two inputs. They consist of two identical subnetworks that share weights and are trained on pairs of similar and dissimilar examples. By using the output of the Siamese network as hash codes, the system can create a hashing algorithm that maps similar inputs to similar hash codes. Examples of Siamese network-based hashing includes Deep Supervised Hashing and Supervised Discrete Hashing. As a last step 705, GenAI CVX 200 can store the plurality of part identifiers as a registered content group in a content database. The content database may also be referred to as a registered content library 600. The registered content group may comprise a collection of hash values (i.e., part identifiers), a group identifier, and the generating service which produced the generated content.

FIG. 8 is a method diagram illustrating an exemplary method 800 for assigning a part identifier using a perceptual hashing function, according to an embodiment. According to the embodiment, the process begins at step 801 when a GenAI CVX has broken submitted content into a plurality of parts and a first part is to be processed. At step 802 content registration engine 210 may extract key features from the part. In the use case of images, these features could include color distribution, texture, and other visual characteristics. At step 803 the extracted features are normalized to reduce sensitivity to variations such as lighting conditions, orientation, or scaling. This step aims to make the hash more robust against minor changes that do not significantly affect perceptual similarity. At step 804 a hashing algorithm is applied to the normalized features to generate a hash value. For example, perceptual hashing algorithms that may be used for image processing include pHash, dHash, and aHash. The hashing algorithm should produce a fixed-size hash that represents the unique characteristics of the content. The key aspect of perceptual hashing is that similar content should produce similar hash values. This means that even if the content has undergone minor alterations or transformations (e.g., resizing, compression, slight color changes), the hash values should remain close. The hash value may be assigned to the part as a part identifier at step 805. The part identifier may be associated with content group and stored in database 220.

FIG. 12 is a flow diagram illustrating an exemplary method 1200 for performing content similarity and verification using a GenAI CVX, according to an embodiment.

According to the embodiment, the process begins at step 1201 when an external party submits a form of input content to GenAI CVX for the purpose of determining if the input content is similar to any registered content stored in a content database. The registered content may comprise content generated by one or more generative AI systems and content created by a human or group of humans. The received input content may be analyzed to determine a content type to be identified and assigned to the input content. This identification may be used in downstream processes related to hashing and data deconstruction. At step 1202, content verification subsystem 1000 can deconstruct the input content into a plurality of data segments using one or more various methods for breaking the input content into smaller pieces of data. At step 1203, a hashing subsystem assigns each of the plurality of data segments a hash value using a hashing algorithm. In some embodiments, the identified content type as determined above may be used when selecting a hashing algorithm. The total set of hash values generated for the entire plurality of data segments may be referred to and stored in a temporary cache as a content group representing the input content.

At step 1204, content verification subsystem 1000 can perform a global search of the content database 220 to compare each of the hash values of the content group against the database of registered content groups to identify a match. A global search is performed searching for any matched, or partially matched hash values. When a match or partial match is located, the registered content group associated with match or partial match may be flagged as a candidate group. After the initial global search, each flagged candidate group may be the subject of refined search which checks each of the hash values for the input content across all registered hash values in the candidate groups. A check is made to determine if a match is found at 1205. If no matches are found during the search and comparison, then the process proceeds to step 1206 wherein the stored content group in the cache may be added and stored to the content database as a new registered content group. If instead, there is a match found, then the process proceeds to step 1207 wherein the search is refined by carefully scanning the candidate groups hash values to measure similarity between hash values. At step 1208, content verification subsystem 1000 can compute a similarity score based on the measured similarity of each hash value of the candidate group. As a last step 1209, GenAI CVX can report the results of the content verification/similarity query. For example, GenAI CVX may indicate that the input content does not match any registered content and has been added to the content database. Another example may involve GenAI CVX indicating a statistical likelihood that the input content is derived from registered content based on the computed similarity score.

FIG. 13 is a flow diagram illustrating an exemplary method 1300 for creating a unique measure of generated content that is robust, tolerant of transformation, computationally reasonable, and platform agnostic, according to an embodiment. According to an embodiment, the method may be performed by a Generative AI Content Verification Exchange system 200 and/or one or more of its subsystem components. According to the embodiment, the process begins at step 1301 by breaking down input content into smaller components. Input content may comprise digital content or digitized versions of traditional content (e.g., print, paintings, sculpture, music, etc.). Each media type may have specific adaptations, but each follows the general steps outlined by method 1300. Images may be segmented/deconstructed into many smaller sub-images, text into n-word grams, audio clips into a series of short clips, sculpture or architecture into 3-dimensional spaces (e.g., meshing with finite element analysis). In some embodiments, input content may be deconstructed based on user-declared meshes and/or system-generated mesh patterns. These smaller components may have overlap with neighbors; however, it is not required.

At step 1302, system 200 uses an artificial neural network (ANN) to compress each subcomponent into a latent space vector as a unique encoding. This yields an identifier for each subcomponent that also represents the essence the input content. In some implementations, the ANN may be configured as the left side of a Variational Autoencoder network. Other ANN architectures which may be implemented can include, but are not limited to, a multilayer perception ANN, convolutional ANN, autoencoder networks, recurrent ANN, or any ensemble model using these or other models. This results in a plurality (set) of latent content vectors which represent the input content.

At step 1303, system 200 uses another ANN to project this commutative set of encoding vectors into a high-dimensional feature vector representation of the original input content as a whole. Being commutative is important to preserve transposition invariance as well as tolerance to other transformation (e.g., cropping of images, edits to text, distortions to audio, etc.). Latent content vectors are fed into the second ANN which produces a single vector projected into a new space that can be used for similarity measurements. From the resultant feature vector representation, a similarity score can be computed at step 1304 using an algorithm that represents how much this content is like a known piece of AI generated content. For example, this similarity score could be measuring the similarity between two pieces of content by the distance between them within this high dimensional feature space. Distance can be calculated using a range of established methods such as, dot product, Euclidean distance, and/or cosine similarity.

At 1305 a check is made by comparing the computed similarity score to a similarity threshold. If the computed similarity score is less than a predefined similarity threshold value, then system 200 determines that the input content is not AI generated content at step 1306. If, instead, the computed similarity score is greater than a threshold value, then system 200 determines that the input content is AI generated content at step 1307.

In this way, method 1300 uses neural networks to learn the patterns of generative AI output and identify new instances of generative AI output by comparing them to the patterns it has learned.

In some implementations, this method may be configured to evaluate existing metadata and take it into account as additional input content context. Using images as exemplary input content, metadata can include information about name, date, and what tools were used to create an image, as well as any edits that were made to the image.

Exemplary Computing Environment

FIG. 14 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like CISC or RISC. Further, computing device 10 may comprise one or more specialized processors such as a graphics processing unit (GPU) 22 configured to accelerate processing of computer graphics and images via a large array of specialized processing cores arranged in parallel. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex or distributed processing tasks. In an embodiment, Kubernetes clusters with contained resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for collaborative generative artificial intelligence (AI) content identification and verification, comprising:

a computing system comprising at least a memory and a processor;

a content verification subsystem comprising a first plurality of programming instructions that, when operating on the processor, cause the computing system to:

receive input content from an external party;

deconstruct the input content into a plurality of data segments using a fractal chunking process that enables scaled evaluation at multiple resolution levels, wherein the data segment can be analyzed at different sizes and resolutions for increasingly rigorous analysis ranging from coarse similarity to fine-grained analysis depending on use case importance and evidence requirements;

for each data segment of the plurality of data segments:

use a hashing algorithm to assign a hash value;

add the hash value to a content group;

compare each of the hash values of the content group or at least one of the group elements against a database of registered content elements or groups to identify a match or computed score, or meeting a specific rule-based criteria, wherein the registered content elements or groups comprise a plurality of hash values representing AI-generated content and human-created content or content of unknown origin;

verify whether a plurality of hash values of the content elements or groups match any of the plurality of hash values representing AI-generated content or any of the plurality of hash values representing human-created content;

when a match or a computed score or meeting a specific rule-based criteria is found with any of the plurality of hash values representing AI-generated content, identify the related plurality of hash values of the content group as AI-generated or label the content group as AI generated; and when a match or a computed score or meeting a specific rule-based criteria is found with any of the plurality of hash values representing human-created content, identify the plurality of hash values of the content group or graph-based entity or edge representations as not AI-generated;

create vectorized representations of content or content relationship graphs or characteristic graphs from subgraphs relevant to each data segment or content piece, wherein the graphs support flexible node and edge attributes and vectors, and wherein the graphs support probabilistic weightings for the edges, and wherein the relationships include: sub-elements themselves, relationships between sub-elements, relationships of sub-elements to the content chunk as a whole, and relationships to other content including non-internet sources;

perform vector comparisons between the subgraphs for multiple pieces of content using hierarchical recursive analysis at multiple scales;

use the vector comparisons to further corroborate or dispel content similarity by considering:

the input content itself;

a distribution of the input content across multiple resolution scales enabling hierarchical recursive labelling and search;

broader internet or other references to the content pieces;

similar content based on the hashes or the graph relationships or other elements, including standalone content bits as well as similar content bits and identification of other entities using such similar bits of content; and temporal dynamics of the content pieces' utilization post creation, including provenance tracking of content propagation and usage patterns; and adjust the similarity score, AI or human generated content scores, or labels based on the vector comparisons and the considered factors.

2. The system of claim 1, further comprising a content registration subsystem comprising a second plurality of programming instructions that, when operating on the processor, cause the computing system to:

receive generated content from a generating service;

assign a group identifier to the generated content, wherein the group identifier is associated with the generating service;

deconstruct the generated content into a plurality of data segments;

for each data segment of the plurality of data segments of the generated content:

use the hashing algorithm to assign a segment identifier;

link the segment identifier with the group identifier;

add the segment identifier to a registered content group; and store the registered content group in the database.

3. The system of claim 2, wherein the generating service uses a generative AI system to create the generated content.

4. The system of claim 2, wherein the generated content is received from a content creator and the group identifier is associated with the content creator.

5. The system of claim 1, wherein when no match is found, the content group is stored in the database as a registered content group.

6. A method for collaborative generative artificial intelligence (AI) content identification and verification, comprising the steps of:

receiving input content from an external party;

deconstructing the input content into a plurality of data segments using a fractal chunking process that enables scaled evaluation at multiple resolution levels, wherein the data segment can be analyzed at different sizes and resolutions for increasingly rigorous analysis ranging from coarse similarity to fine-grained analysis depending on use case importance and evidence requirements;

for each data segment of the plurality of data segments:

using a hashing algorithm to assign a hash value;

adding the hash value to a content group;

comparing each of the hash values of the content group or at least one of the group elements against a database of registered content elements or groups to identify a match or computed score, or meeting a specific rule-based criteria, wherein the registered content elements or groups comprise a plurality of hash values representing AI-generated content and human-created content or content of unknown origin;

verifying whether a plurality of hash values of the content elements or groups match any of the plurality of hash values representing AI-generated content or any of the plurality of hash values representing human created content;

when a match or a computed score or meeting a specific rule-based criteria is found with any of the plurality of hash values representing AI-generated content, identifying the plurality of hash values of the content group as AI-generated or label the content group as AI generated, and when a match or a computed score or meeting a specific rule-based criteria is found with any of the plurality of hash values representing human created content, identifying the plurality of hash values of the content group or graph-based entity representations as not AI-generated;

creating vectorized representations of content or content relationship graphs or characteristic graphs from subgraphs relevant to each data segment or content piece, wherein the graphs support flexible node and edge attributes and vectors, and wherein the graphs support probabilistic weightings for the edges, and wherein the relationships include sub-elements themselves, relationships between sub-elements, relationships of sub-elements to the content chunk as a whole, and relationships to other content including non-internet sources;

performing vector comparisons between the subgraphs for multiple pieces of content using hierarchical recursive analysis at multiple scales;

using the vector comparisons to further corroborate or dispel content similarity by considering:

the input content itself;

a distribution of the input content across multiple resolution scales enabling hierarchical recursive labelling and search;

broader internet or other references to the content pieces;

similar content based on the hashes or the graph relationships or other elements, including standalone content bits as well as similar content bits and identification of other entities using such similar bits of content; and temporal dynamics of the content pieces' utilization post creation, including provenance tracking of content propagation and usage patterns; and adjusting the similarity score, AI or human generated content scores, or labels based on the vector comparisons and the considered factors.

7. The method of claim 6, further comprising the steps of:

receiving generated content from a generating service;

assigning a group identifier to the generated content, wherein the group identifier is associated with the generating service;

deconstructing the generated content into a plurality of data segments;

for each data segment of the plurality of data segments of the generated content:

using the hashing algorithm to assign a segment identifier;

linking the segment identifier with the group identifier;

adding the segment identifier to a registered content group; and storing the registered content group in the database.

8. The method of claim 7, wherein the generating service uses a generative AI system to create the generated content.

9. The method of claim 7, wherein the generated content is received from a content creator and the group identifier is associated with the content creator.

10. The method of claim 6, wherein when no match is found, the content group is stored in the database as a registered content group.

11. One or more non-transitory computer-storage media having computer-executable instructions embodied thereon that, when executed by one or more processors of a computing system employing a platform for collaborative generative artificial intelligence content identification and verification, cause the computing system to perform the method of claim 6.

12. The one or more non-transitory computer-storage media of claim 11 that further have computer-executable instructions embodied thereon that, when executed by one or more processors of a computing system employing platform for collaborative generative artificial intelligence content identification and verification, cause the computing system to perform the method of claim 7.

13. The system of claim 1, wherein the broader internet or other references include private network data stores, and wherein access to private network references is controlled based on clearance levels or access permissions.

14. The system of claim 1, wherein the input content is deconstructed based on fractal distributions, user-declared meshes, or system-generated mesh patterns.

15. The system of claim 1, wherein the graph-based entity representations are stored in graph databases and comprise relationships between unique hashes representing content elements, and wherein subgraphs are used alongside semantic similarity measures.

16. The system of claim 1, wherein the system comprises multiple private networks arranged in a hierarchy with varying levels of access, wherein each private network comprises its own content database, and wherein content lookup searches local databases before accessing subordinate private networks based on clearance level.

17. The method of claim 6, wherein the broader internet or other references include private network data stores, and wherein access to private network references is controlled based on clearance levels or access permissions.

18. The method of claim 6, wherein the input content is deconstructed based on fractal distributions, user-declared meshes, or system-generated mesh patterns.

19. The method of claim 6, wherein the graph-based entity representations are stored in graph databases and comprise relationships between unique hashes representing content elements, and wherein subgraphs are used alongside semantic similarity measures.

20. The method of claim 6, wherein the method comprises multiple private networks arranged in a hierarchy with varying levels of access, wherein each private network comprises its own content database, and wherein content lookup searches local databases before accessing subordinate private networks based on clearance level.

* * * * *